(12) United States Patent
Ménard

(10) Patent No.: US 11,147,304 B2
(45) Date of Patent: Oct. 19, 2021

(54) APPARATUS AND METHOD FOR PITTING DRUPES

(71) Applicant: DESIGN CONCEPT X INC., Compton (CA)

(72) Inventor: Philippe Ménard, Compton (CA)

(73) Assignee: DESIGN CONCEPT X INC., Compton (CA)

( * ) Notice: Subject to any disclaimer, the term of this patent is extended or adjusted under 35 U.S.C. 154(b) by 0 days.

(21) Appl. No.: 16/493,962

(22) PCT Filed: May 22, 2018

(86) PCT No.: PCT/CA2018/050594
§ 371 (c)(1),
(2) Date: Sep. 13, 2019

(87) PCT Pub. No.: WO2018/209448
PCT Pub. Date: Nov. 22, 2018

(65) Prior Publication Data
US 2020/0404959 A1      Dec. 31, 2020

Related U.S. Application Data

(60) Provisional application No. 62/508,644, filed on May 19, 2017.

(51) Int. Cl.
*A23N 4/06*      (2006.01)

(52) U.S. Cl.
CPC ..................... *A23N 4/06* (2013.01)

(58) Field of Classification Search
USPC .......................... 99/552, 547, 562; 426/485
See application file for complete search history.

(56) References Cited

U.S. PATENT DOCUMENTS 3,454,064 A    7/1969   Weber et al.
3,731,615 A    5/1973   Margaroli et al.
(Continued)

FOREIGN PATENT DOCUMENTS

CN      103494307       1/2014
CN      103549627       2/2014
(Continued)

OTHER PUBLICATIONS

English Abstract—Machine Generated of WO2014064760(A1), "Fruit Pitting Apparatus, Fruit Pitting Method, and Pitted Fruit", published on May 1, 2014.
(Continued)

*Primary Examiner* — Dana Ross
*Assistant Examiner* — Joe E Mills, Jr.
(74) *Attorney, Agent, or Firm* — Bereskin & Parr LLP/S.E.N.C.R.L., s.r.l.

(57) ABSTRACT

A device for pitting drupes, the device comprising at least one support member to receive a drupe, the at least one support member having at least one opening; and at least one knife for pitting the drupe, the at least one knife defining an internal bore for permitting a fluid to pass through the tip of the knife and favoring ejection of a pitted element from the drupe; the at least one knife and the at least one support member being movable with respect to one another.

19 Claims, 36 Drawing Sheets

(56) References Cited

U.S. PATENT DOCUMENTS

| | | | |
|---|---|---|---|
| 3,965,809 A * | 6/1976 | Kieldsen | A23N 4/06 99/492 |
| 4,871,568 A * | 10/1989 | Cimperman | A23N 4/085 426/484 |
| 4,913,044 A | 4/1990 | Heath | |
| 5,870,949 A | 2/1999 | Cimperman et al. | |
| 5,992,310 A | 11/1999 | Castro | |
| 7,779,752 B1 * | 8/2010 | Ellison | A23N 4/085 99/494 |
| 8,196,508 B2 | 6/2012 | Larsen | |
| 8,955,427 B2 | 2/2015 | Gonzalez | |
| 2012/0070555 A1 * | 3/2012 | Larsen | A23N 3/04 426/485 |
| 2013/0305934 A1 * | 11/2013 | Gonzalez | A23N 3/04 99/561 |
| 2016/0000137 A1 * | 1/2016 | Kirkjan | A23L 19/03 426/485 |
| 2016/0157514 A1 | 6/2016 | Flora | |

FOREIGN PATENT DOCUMENTS

| | | |
|---|---|---|
| CN | 103549628 | 2/2014 |
| WO | 2014064760 | 5/2014 |

OTHER PUBLICATIONS

English Translation—Machine Generated of CN103494307(A), "Automatic Sorting Longan Pitting Machine", published on Jan. 8, 2014.
English Translation—Machine Generated of CN103549627(A), "Pneumatic Type Longan Pitting Machine", published on Feb. 5, 2014.
English Translation—Machine Translated of CN103549628(A), "Dried Longan Pitting Machine", published on Feb. 5, 2014.

* cited by examiner

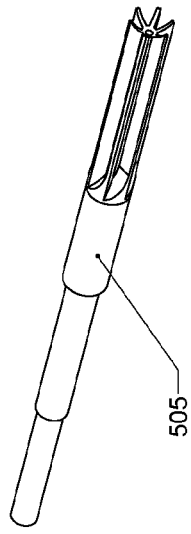
FIG. 7A2
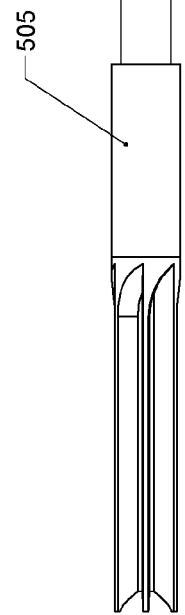
FIG. 7A3
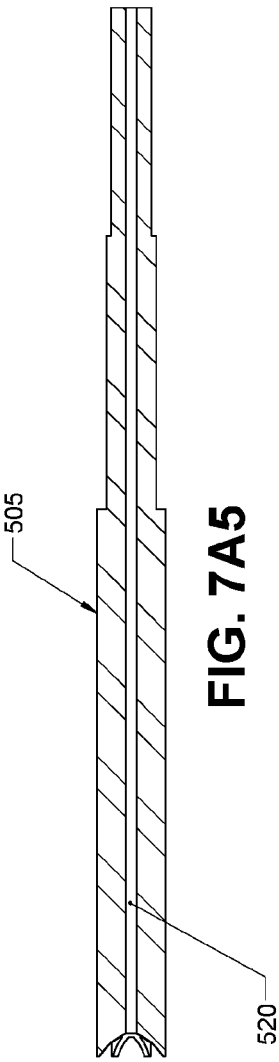
FIG. 7A5
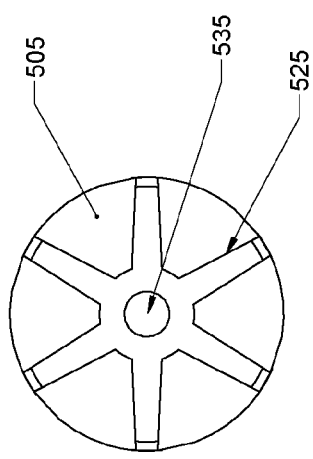
FIG. 7A1
FIG. 7A4

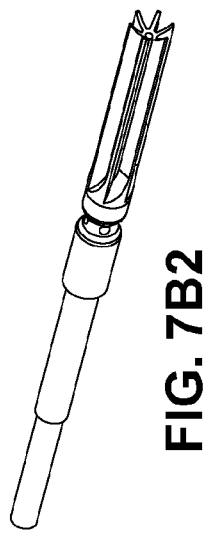
FIG. 7B2
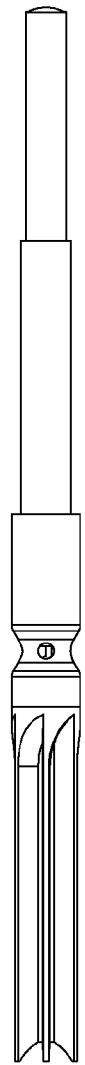
FIG. 7B3
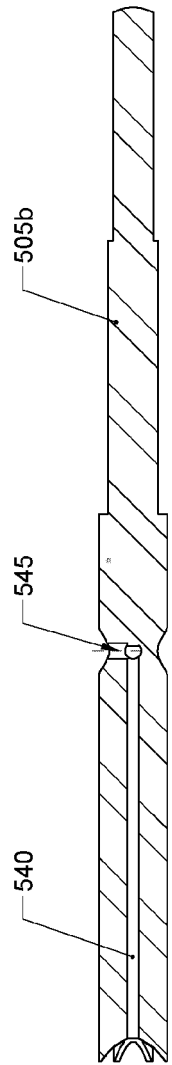
FIG. 7B5
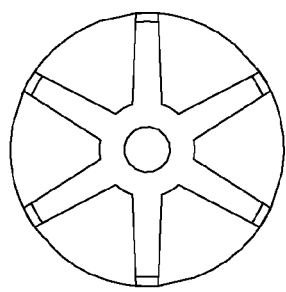
FIG. 7B1
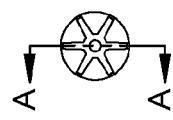
FIG. 7B4

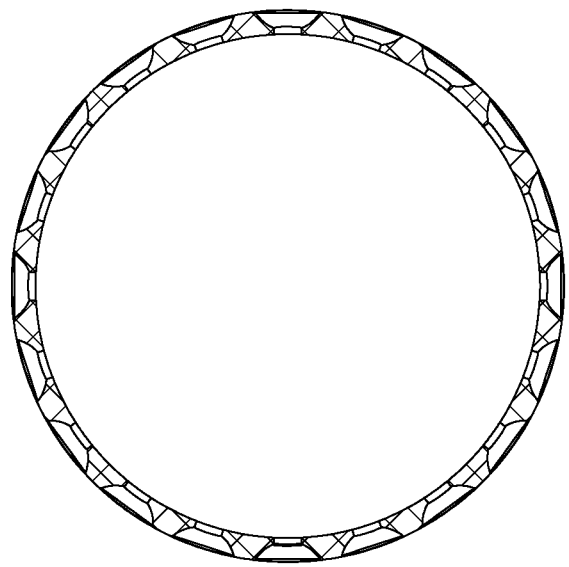
FIG. 13B2
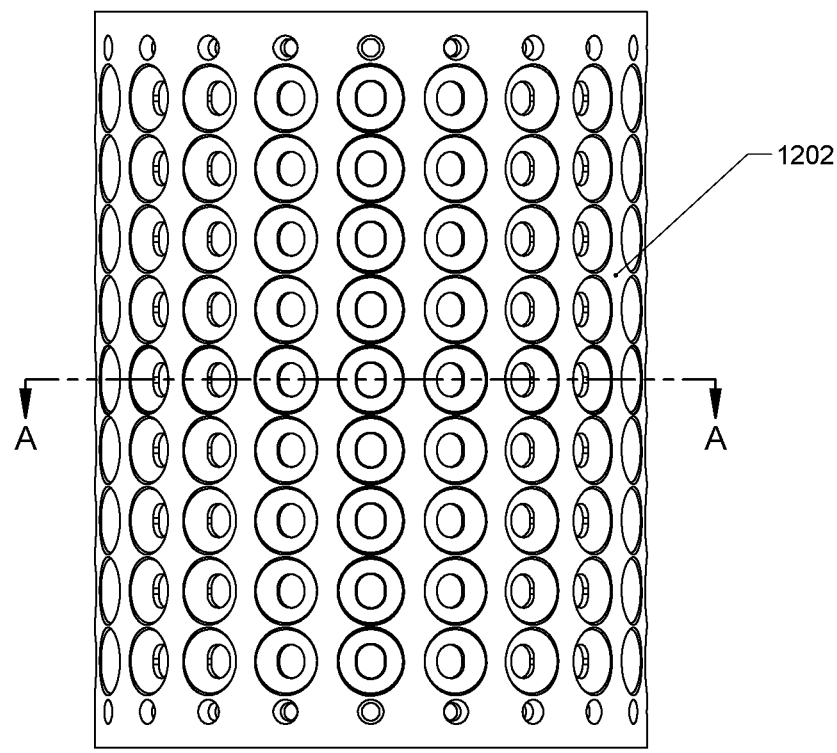
FIG. 13B1

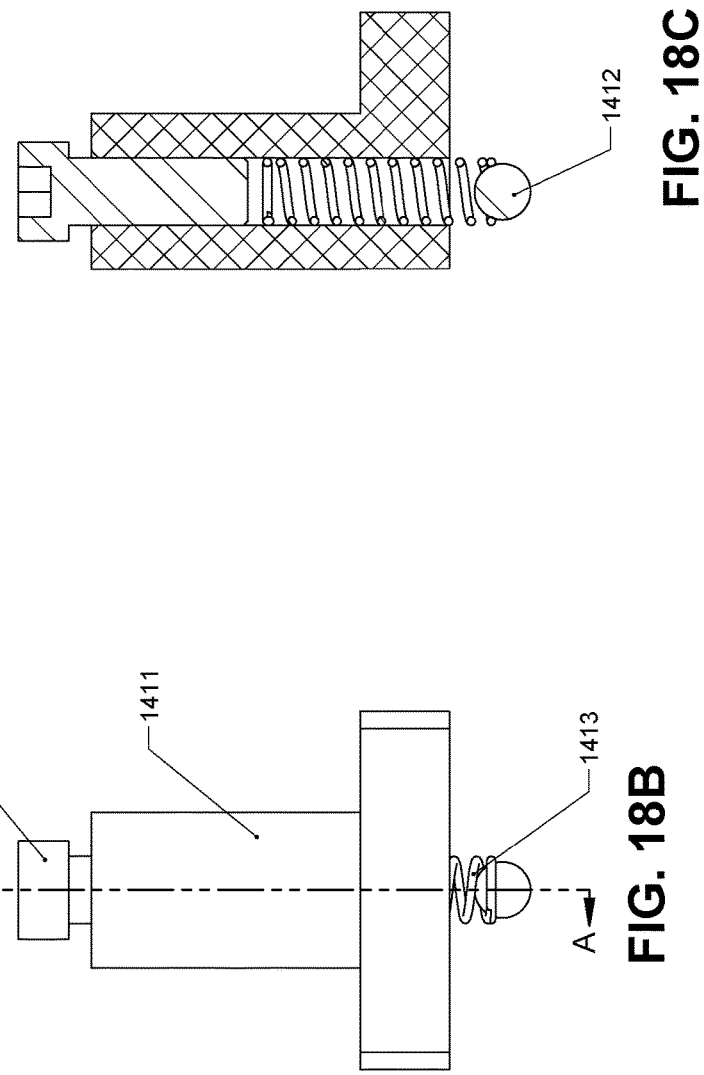

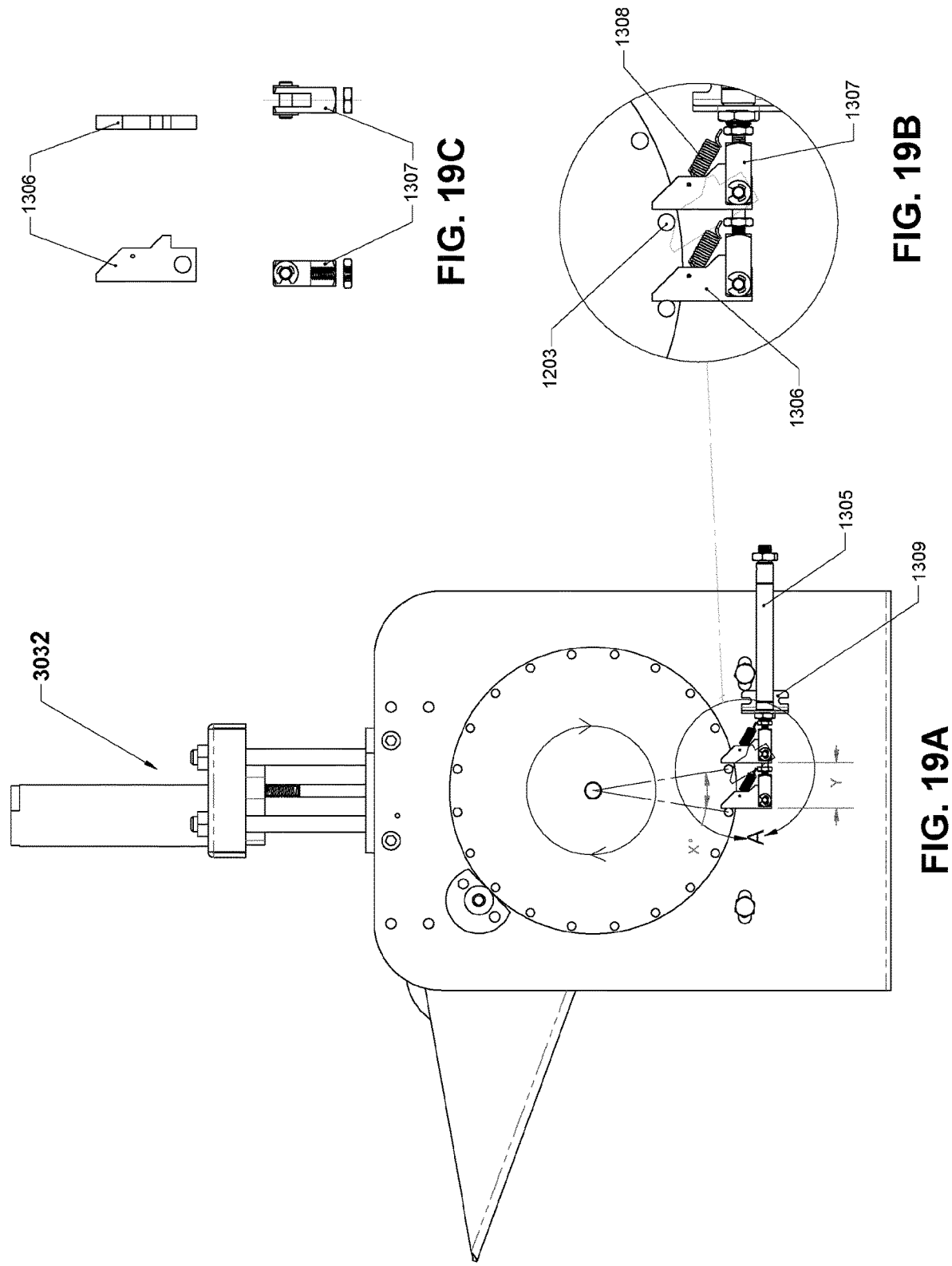

APPARATUS AND METHOD FOR PITTING DRUPES

CROSS-REFERENCE TO RELATED APPLICATIONS

The present application is a 35 U.S.C. 371 national stage entry of PCT/CA2018/050594 filed on May 22, 2018 and which claims priority on U.S. 62/508,644 filed on May 19, 2017. These documents are hereby incorporated by reference in their entirety.

FILED OF THE DISCLOSURE

The present subject matter relates to an apparatus and method for pitting drupes.

BACKGROUND OF THE DISCLOSURE

In the preparation of drupes, food items or fruits, such as cherries, peaches, olives and apricots, for drying and canning, automatic devices for small and medium scale productions to remove pits from fruits are known in the art. These devices uses technologies that have been used for the past few decades and have lower efficiency since: first, such devices do not have many adjustable features; secondly, they may not pit overripe fruits; thirdly, the fruit which is processed by the devices may still have a certain percentage of pits still present inside the fruit; fourthly, during the pitting operation, a certain percentage of the flesh of the fruit is removed along with the pit; and finally, after being pitted the fruit may be stuck in its support member.

SUMMARY OF THE DISCLOSURE

The following summary is intended to introduce the reader to the more detailed description that follows, and not to define or limit the claimed subject matter.

According to an aspect, the present subject matter relates to a device for pitting drupes, the device comprising:
  at least one support member to receive a drupe, the at least one support member having at least one opening; and
  at least one knife for pitting the drupe, the at least one knife defining an internal bore for permitting a fluid to pass through the tip of the knife and favoring ejection of a pitted element from the drupe; the at least one knife and the at least one support member being movable with respect to one another.

According to an aspect, the present subject matter relates to a method for pitting drupes, the method comprising:
  placing at least one drupe on a support member comprising at least one opening; and
  inserting a knife into the drupe and injecting a fluid through a tip of the knife to eject a pit or residues out of the drupe and through the opening.

According to one aspect, the present subject matter relates to a method for pitting drupes, the method including:
  placing at least one drupe on a conveyor comprising at least one support member, wherein the at least one drupe is placed on the at least one support member and wherein the at least one support member includes an opening;
  activating a knife actuator connected to at least one knife to position the at least one knife into the at least one drupe, the at least one knife defining an internal bore for permitting a fluid to pass through the tip of the at least one knife; and
  injecting fluid through the tip of the at least one knife to eject a pit and/or residues out of the at least one drupe and through the opening.

BRIEF DESCRIPTION DRAWINGS

In order that the claimed subject matter may be more fully understood, reference will be made to the accompanying drawings, in which:

Figure 2A:
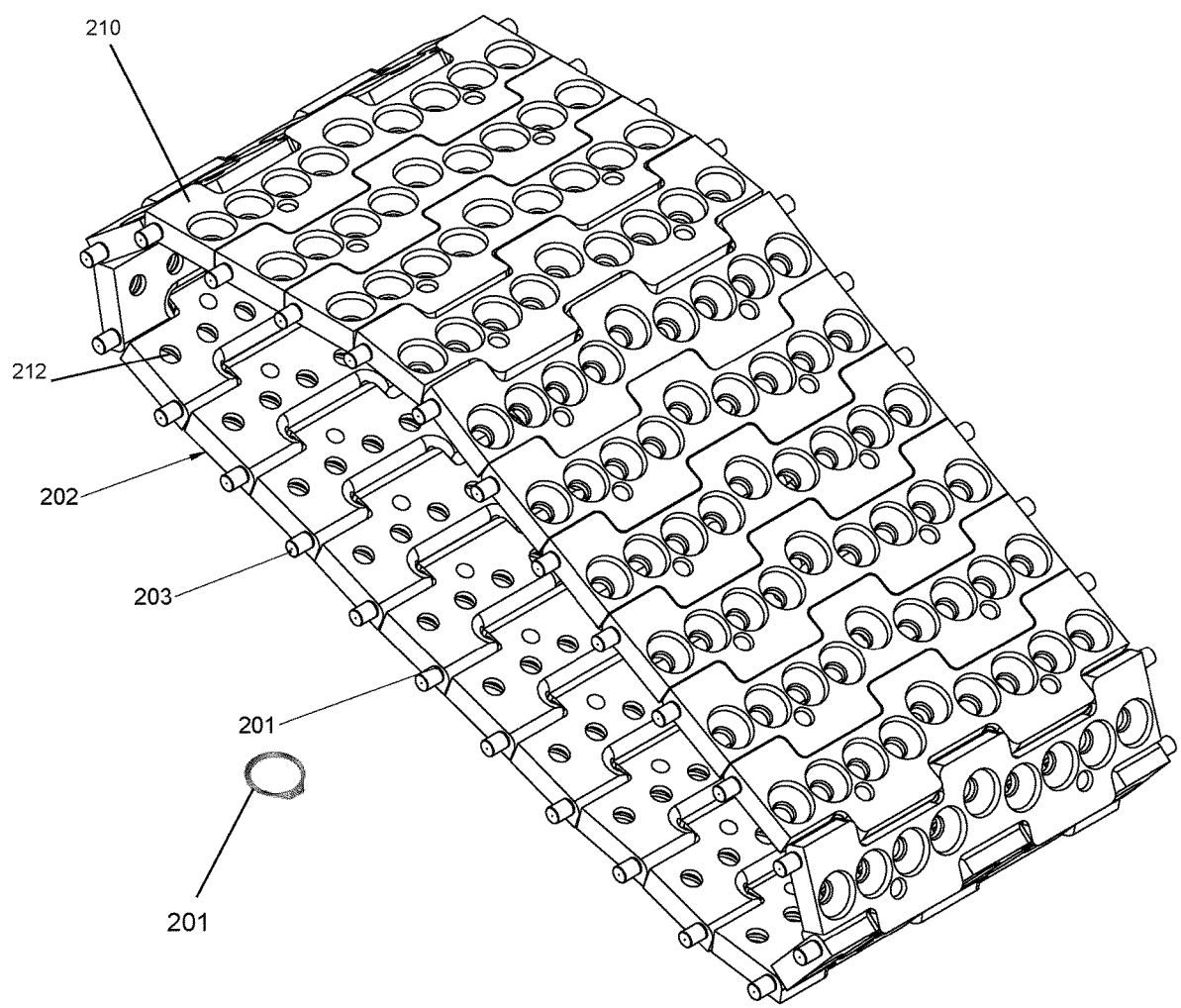
FIG. 2A is a perspective view of a conveyor of the apparatus of FIG. 1A.
Figure 2B:
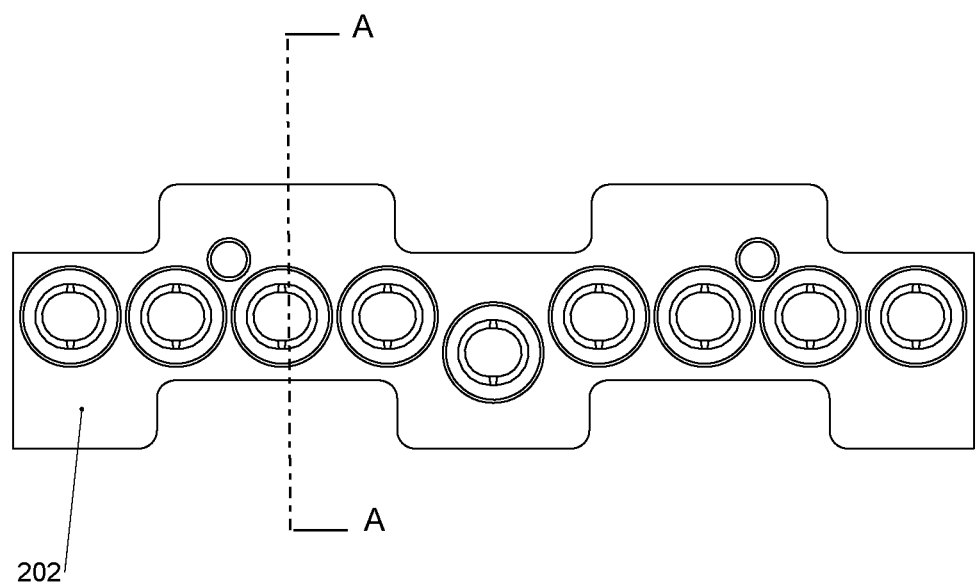
FIG. 2B is a top view of a matrix of FIG. 2A.
Figure 2C:
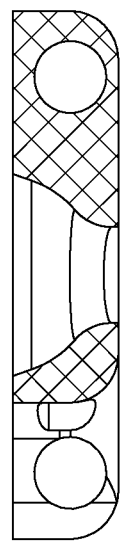
FIG. 2C is a cross section view of the matrix of FIG. 2B along line A-A.
Figure 2D:
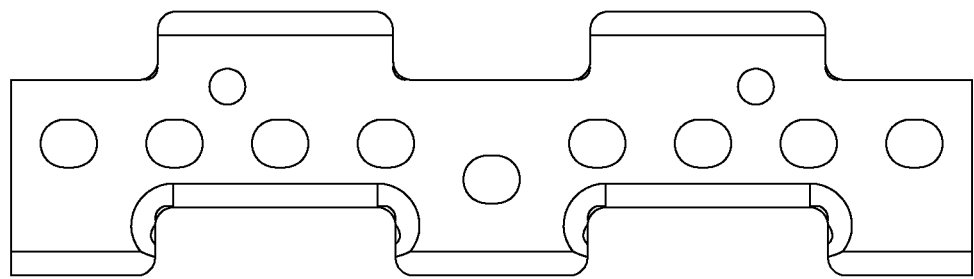
FIG. 2D is a top view of the matrix of FIG. 2A.
Figure 2E:
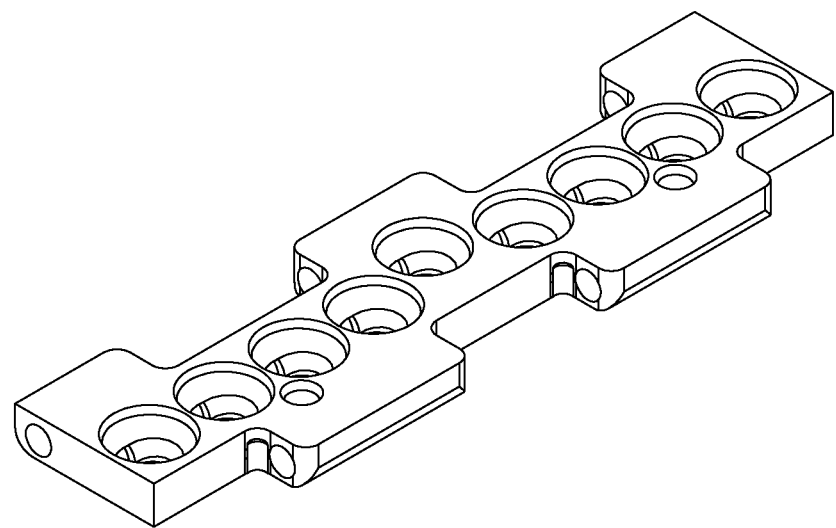
FIG. 2E is a perspective view of the matrix of FIG. 2A.
Figure 3:
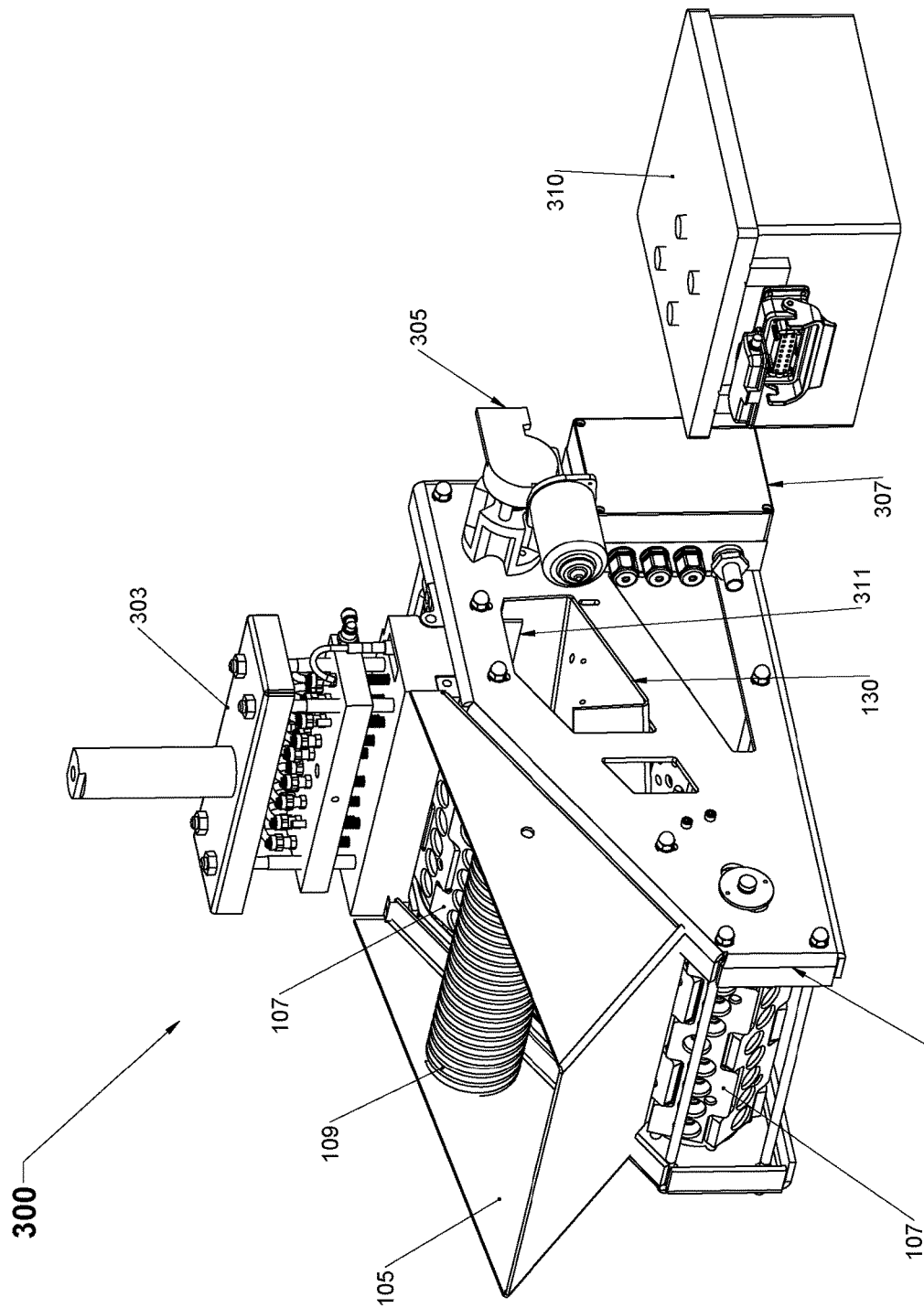
FIG. 3 is a perspective view of an apparatus for pitting drupes according to one embodiment.

FIG. 7A1 is a view of a tip of a knife according to one embodiment;

FIG. 7A2 is a perspective view of the knife of FIG. 7A1;

FIG. 7A3 is a side view of the knife of FIG. 7A2;

FIG. 7A4 is a reduced view of the tip of the knife of FIG. 7A1;

FIG. 7A5 is a cross section view of the knife of FIG. 7A4 along line A-A.

Figure 1A:
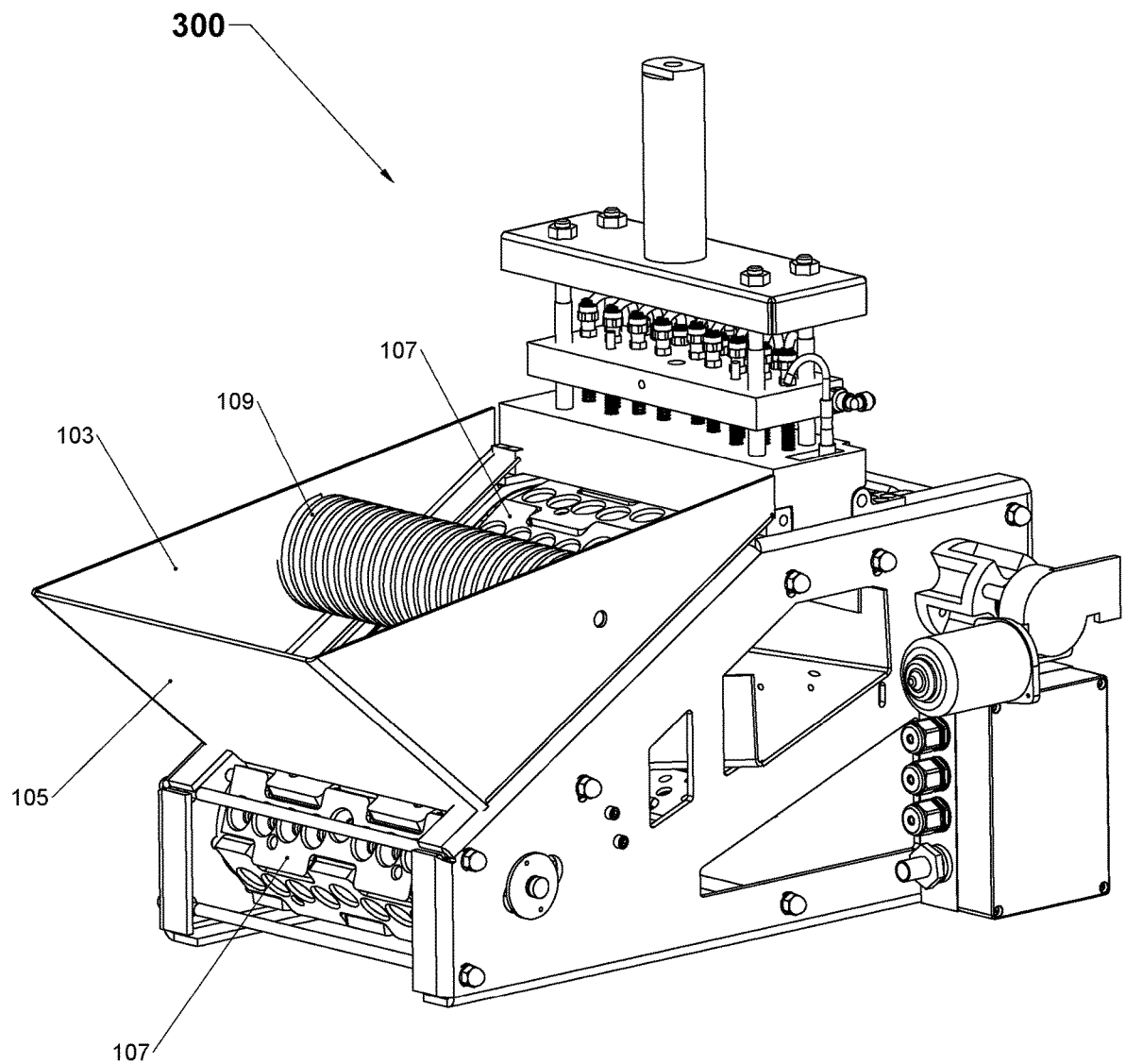
FIG. 1A is a perspective view of an apparatus for pitting drupes, according to one embodiment.
Figure 8:
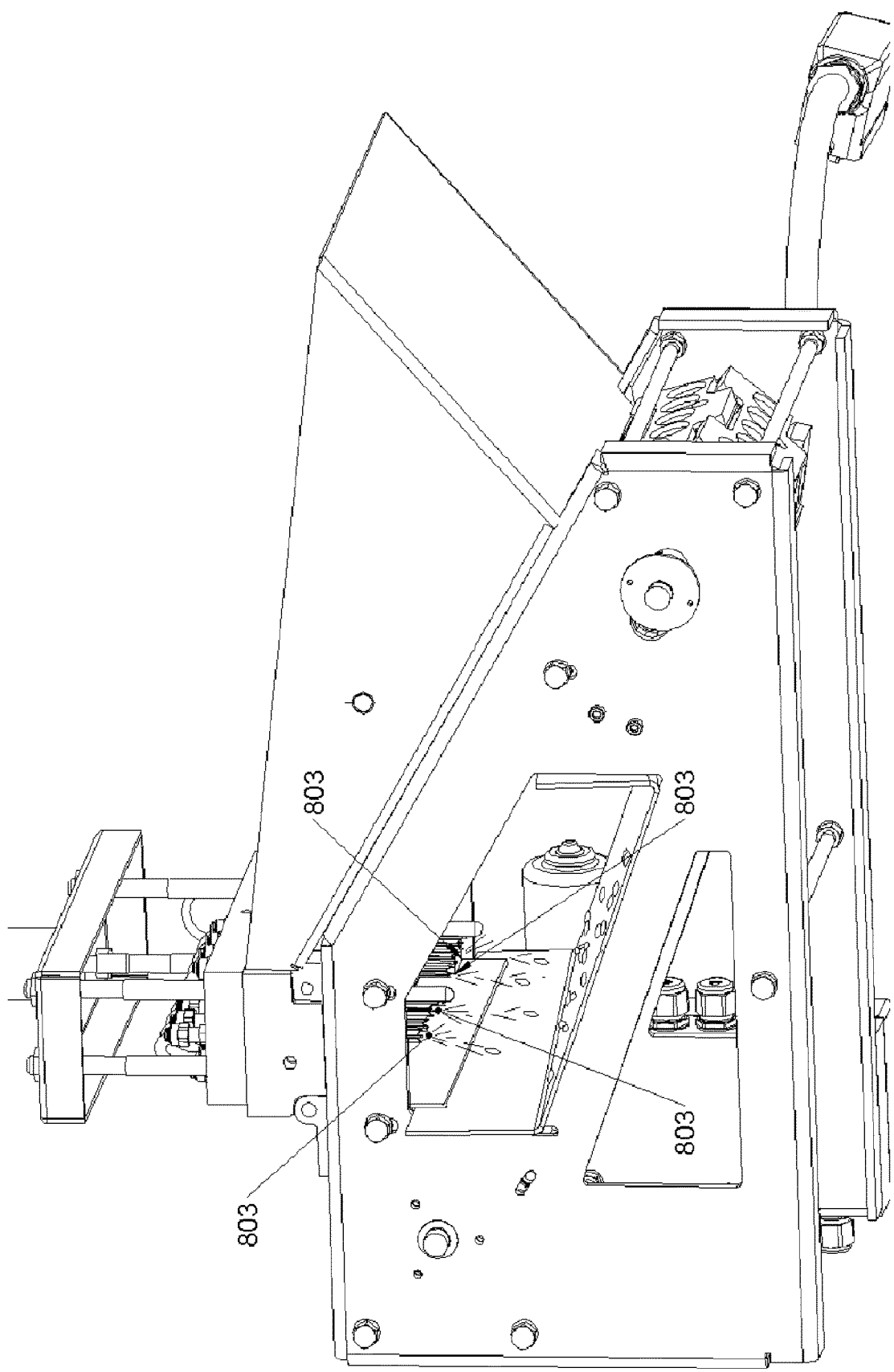
Figure 9A:
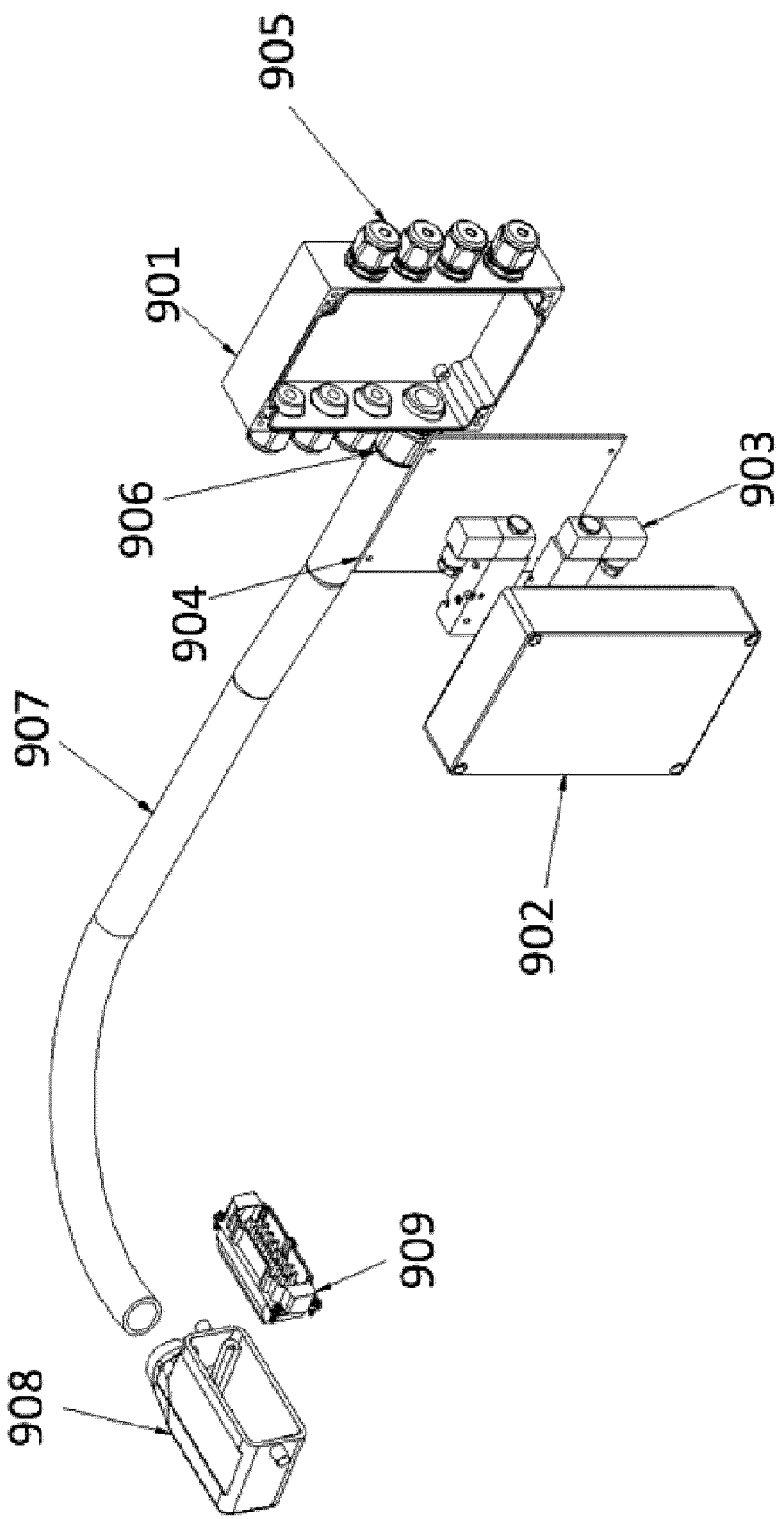
Figure 9B:
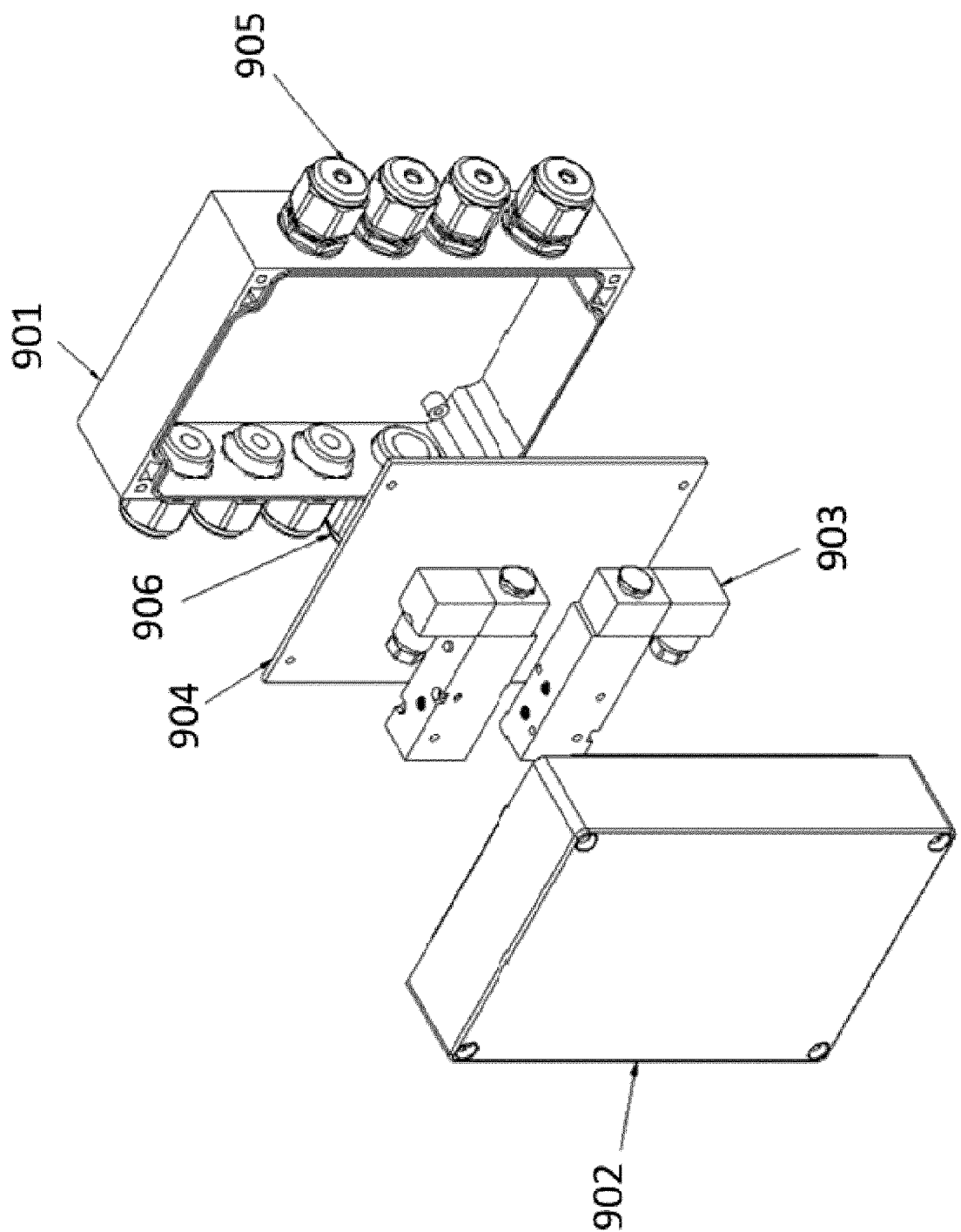
Figure 10:
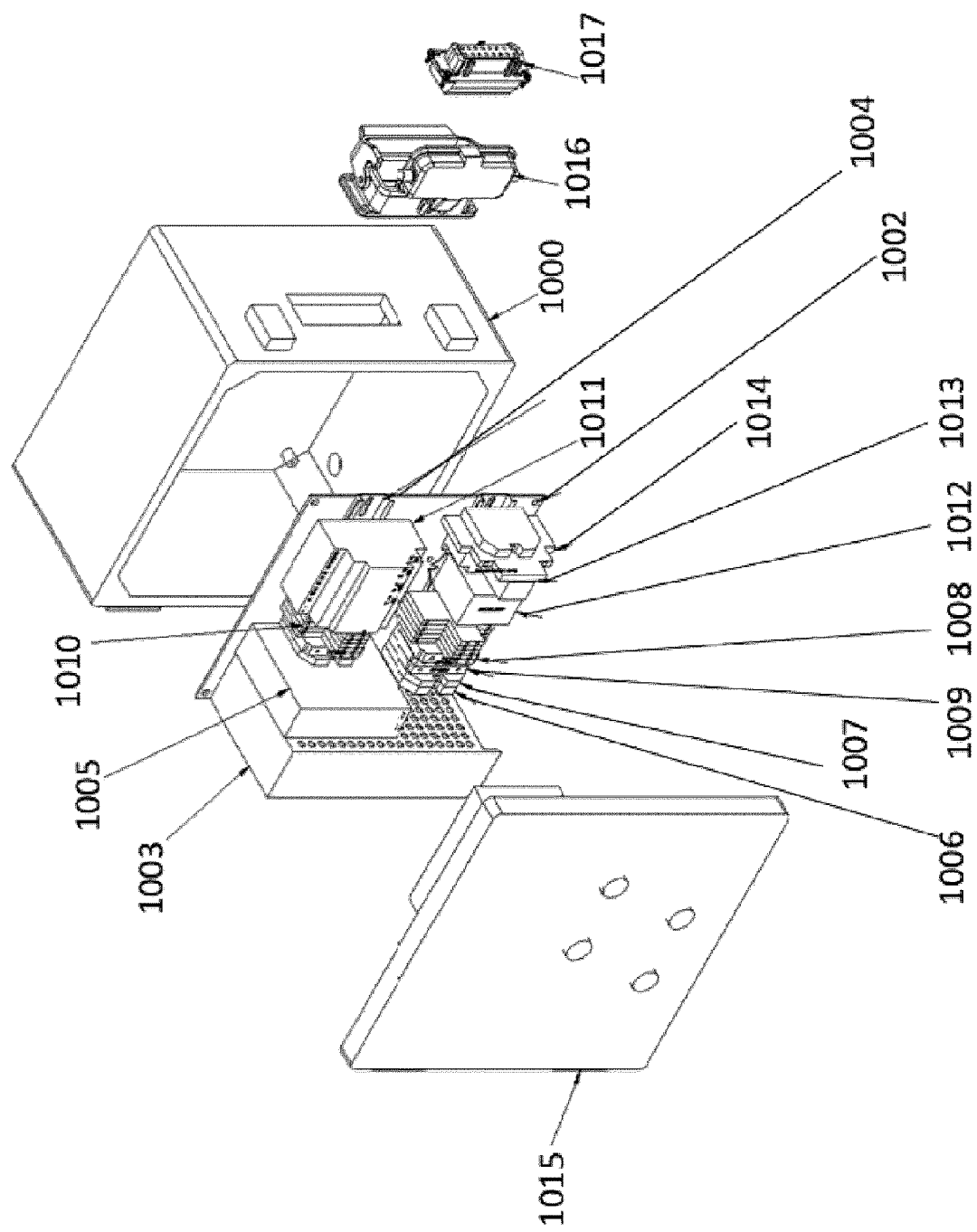
Figure 11:
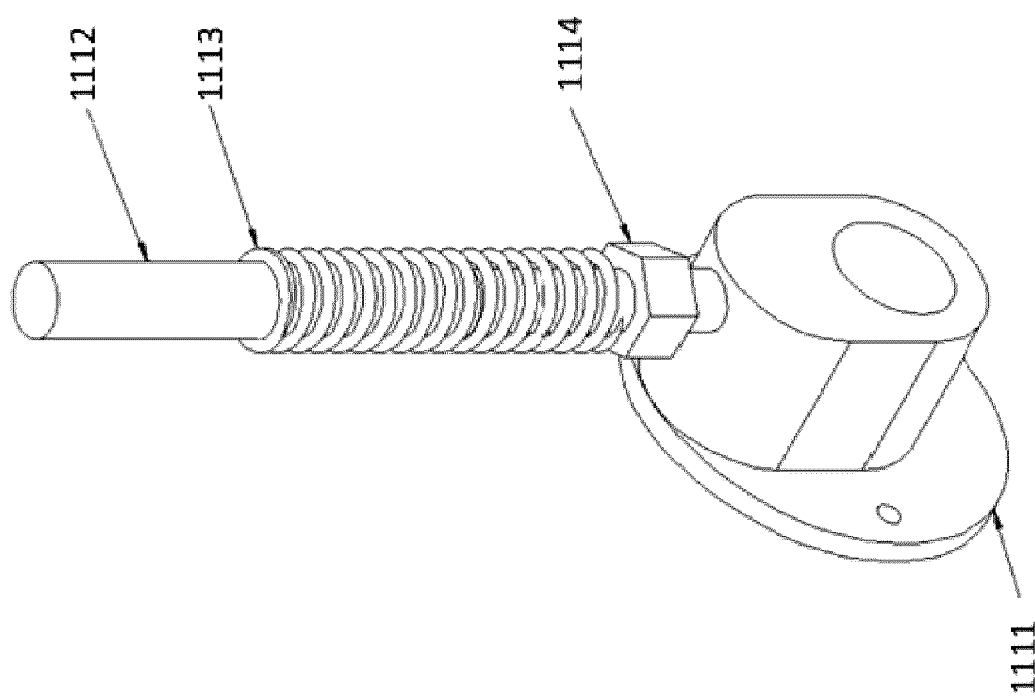
Figure 12A:
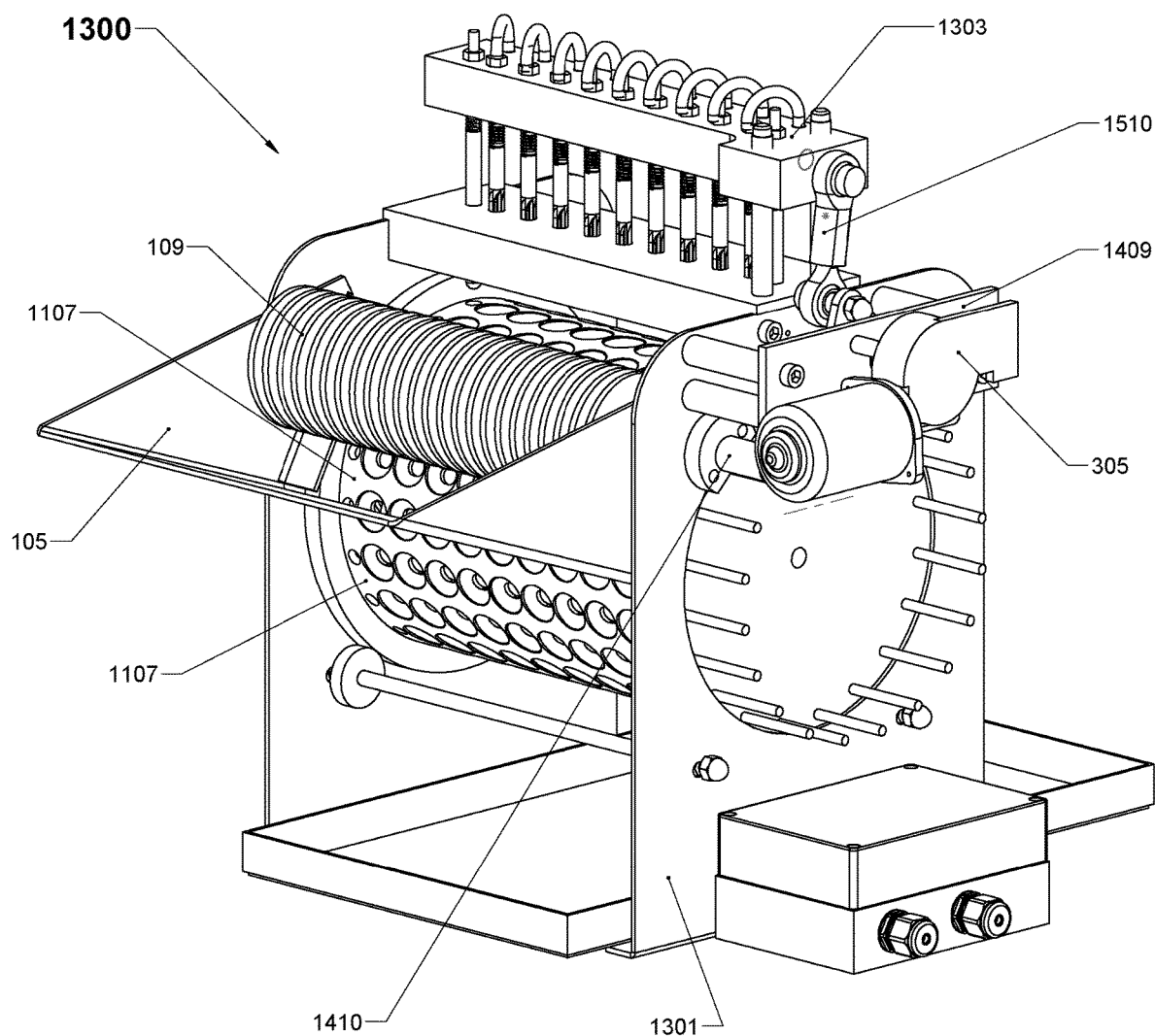
Figure 13A:
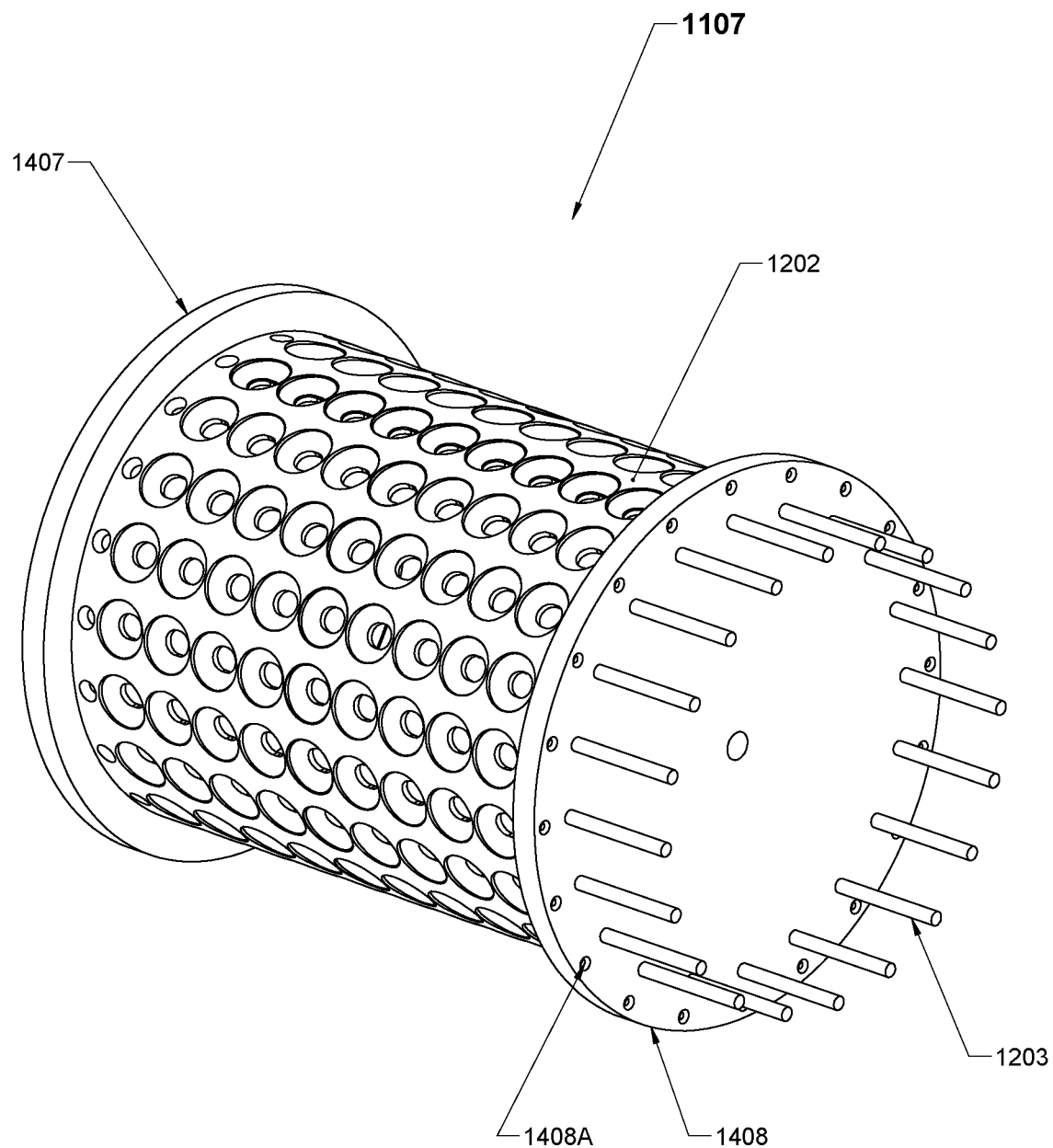
Figure 14:
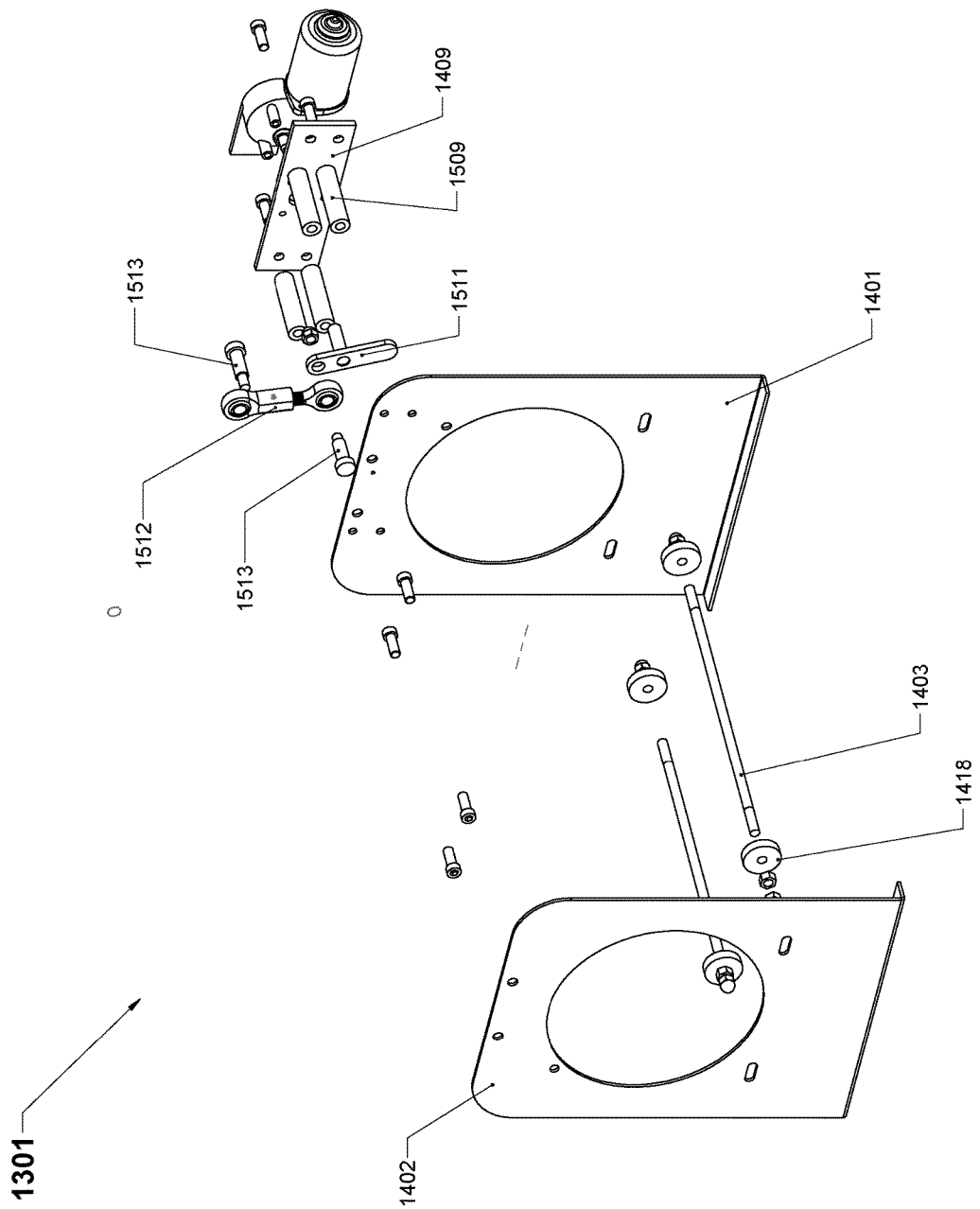
Figure 15:
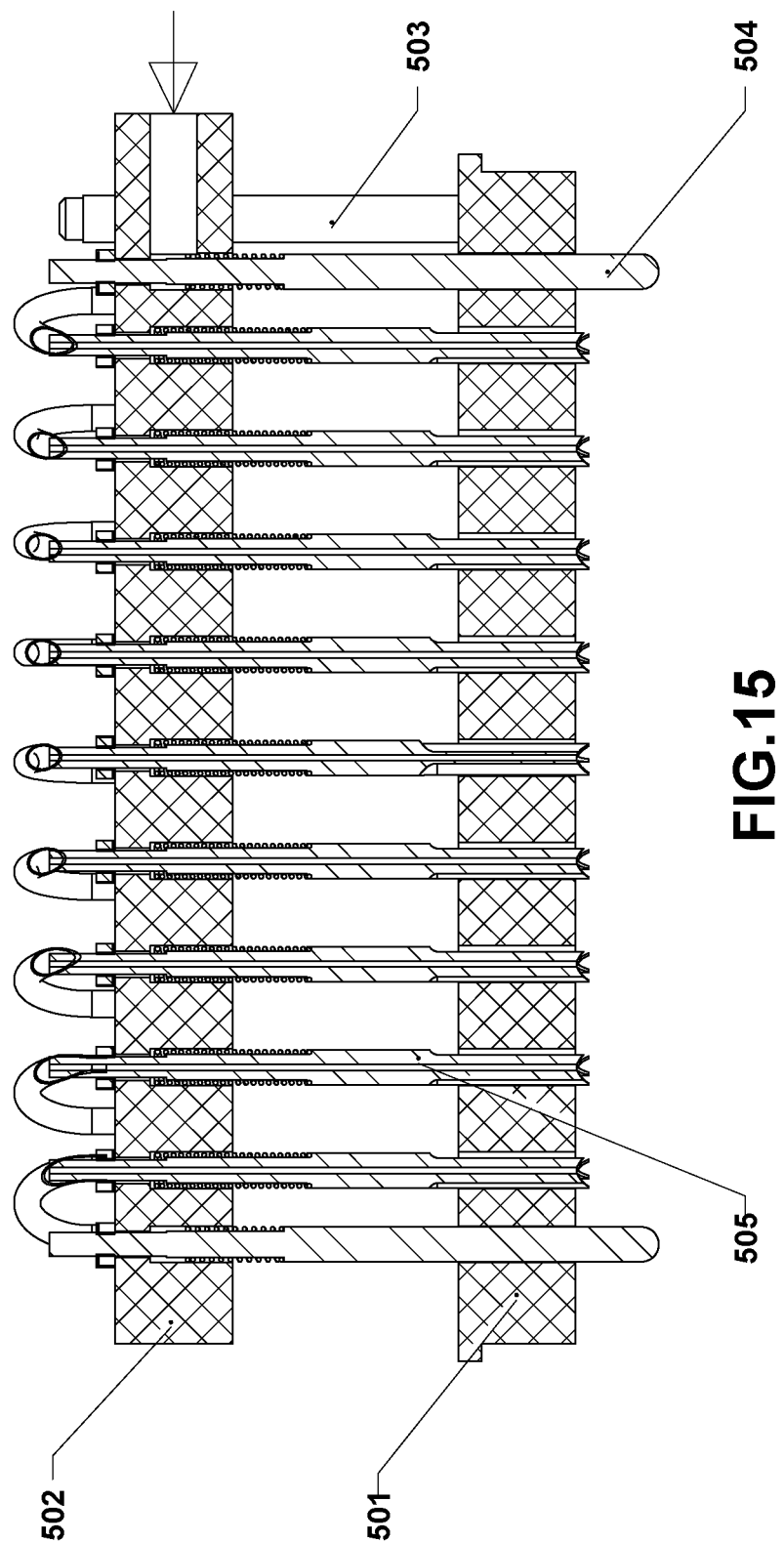
Figure 16:
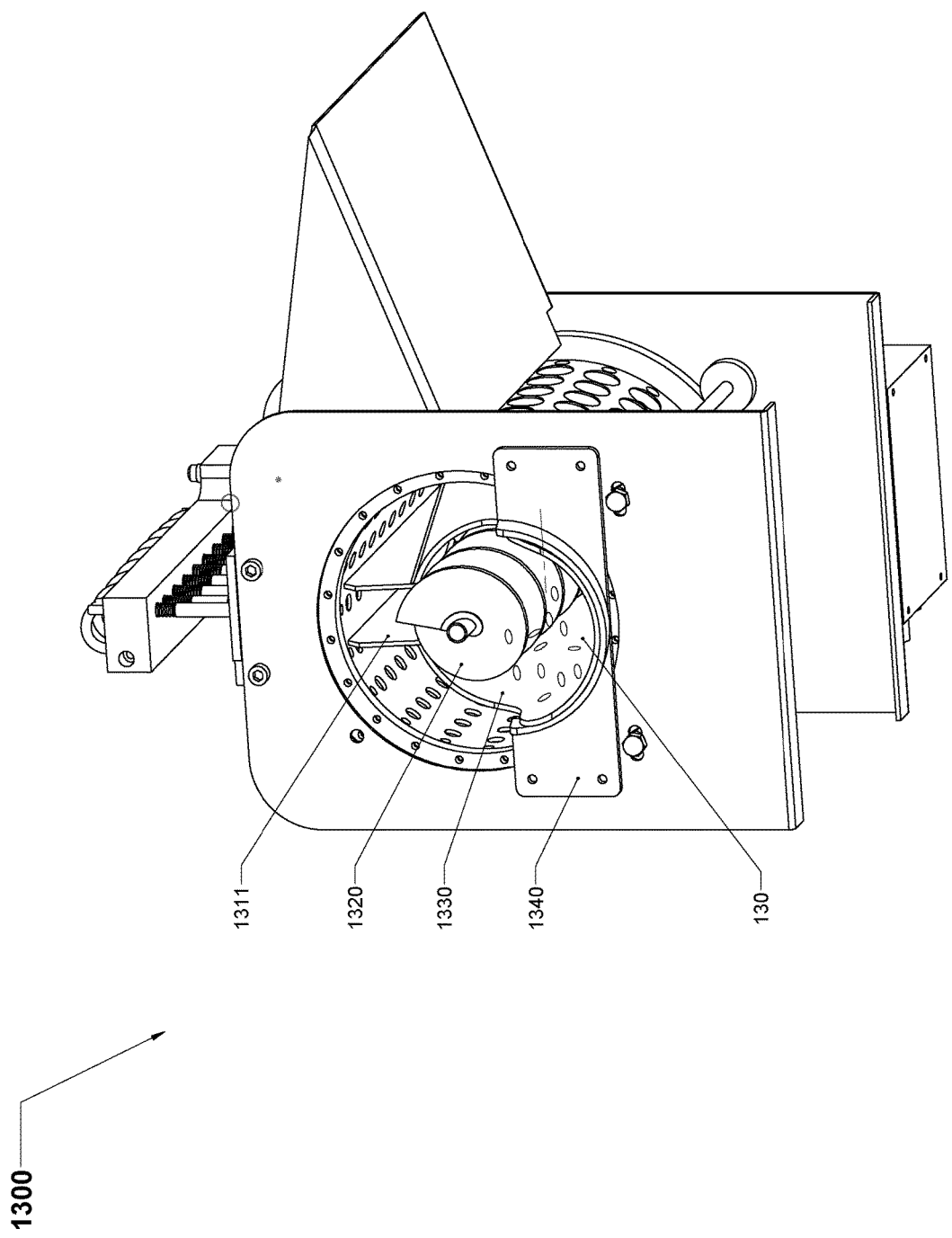
Figure 17B:
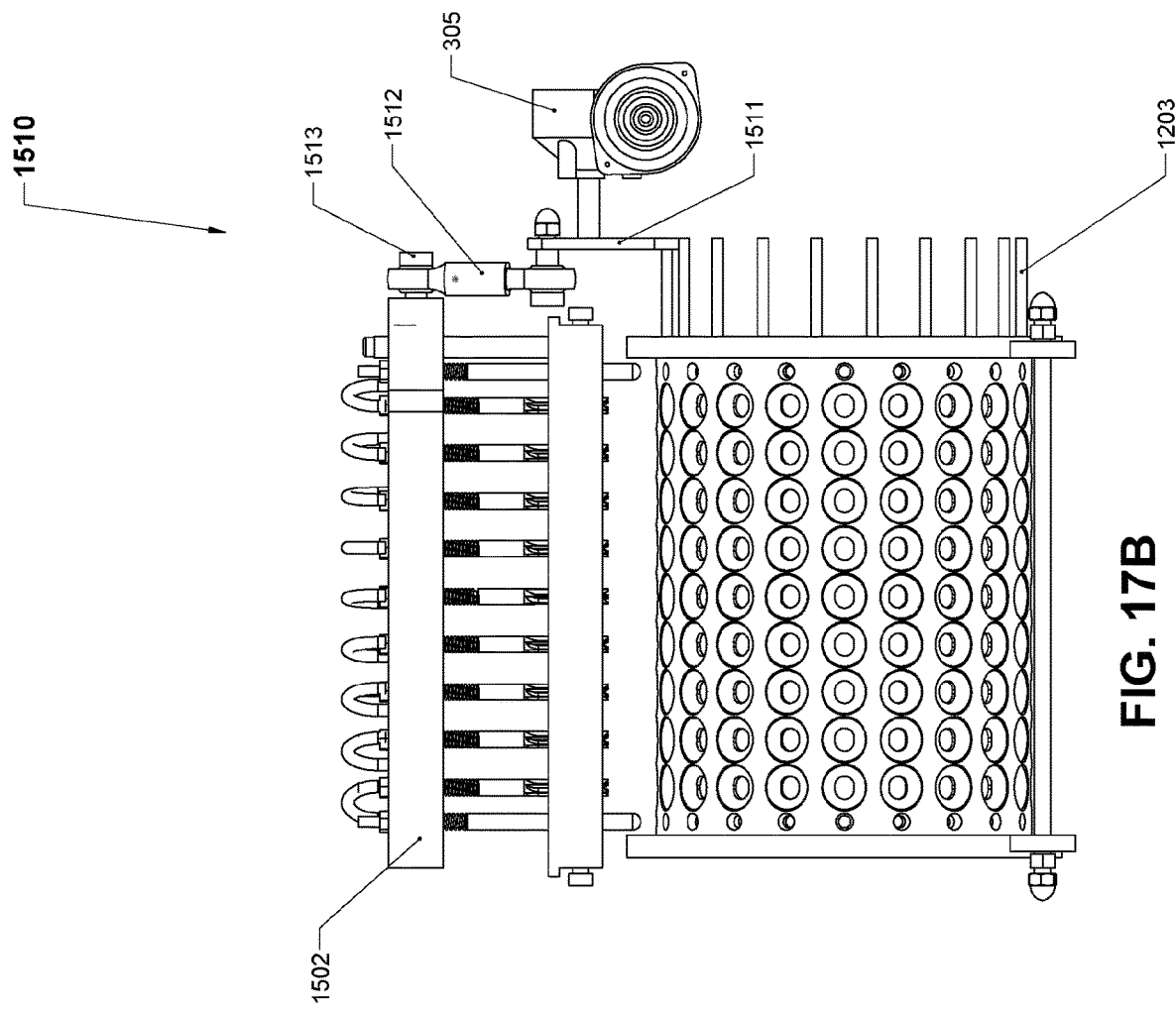
Figure 17A:
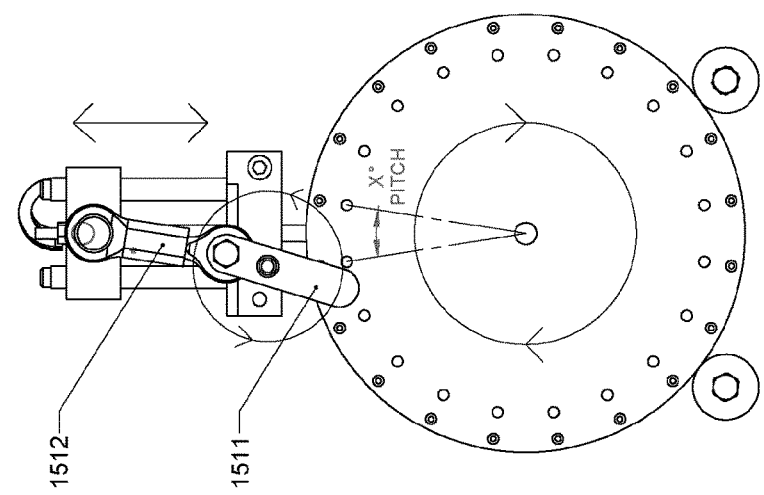

FIG. 7B1 is a view of a tip of a knife according to another embodiment;

FIG. 7B2 is a perspective view of the knife of FIG. 7B1;

FIG. 7B3 is a side view of the knife of FIG. 7B2;

FIG. 7B4 is a reduced view of the tip of the knife of FIG. 7B1;

FIG. 7B5 is a cross section view of the knife of FIG. 7B4 along line A-A;

FIG. 8 is a view of an ejection section of the apparatus of FIG. 1A;

FIG. 9A is an exploded view of an air junction box according to one embodiment;

FIG. 9B is an enlarged view of the air junction box of FIG. 9A;

FIG. 10 is an exploded view of an electrical junction box according to one embodiment;

FIG. 11 is a perspective view of a chain tension block according to one embodiment;

FIGS. 12A, 12B, 12C and 12D show perspective views of an apparatus for pitting drupes, according to another embodiment;

FIG. 13A shows a perspective view of a drum matrix according to one embodiment;

FIG. 13B1 shows a top view of the drum matrix of FIG. 13A;

FIG. 13B2 shows a cross section view of the drum matrix of FIG. 13A along line A-A;

FIG. 14 shows an exploded view of the frame of the apparatus of FIG. 12A;

FIG. 15 shows a cross section view of the punch of an apparatus for pitting drupes according to one embodiment;

FIG. 16 shows a side view of an apparatus for pitting drupes, according to one embodiment;

FIG. 17A shows a side view of a cam assembly of an apparatus for pitting drupes, according to one embodiment;

FIG. 17B shows a front view of the cam assembly of FIG. 17B,

FIG. 18A shows a front view of a tension adjustment guide assembly according to one embodiment;

FIG. 18B shows a top view of the tension adjustment guide assembly of FIG. 18A;

FIG. 18C shows a cross section view of the tension adjustment guide assembly of FIG. 18B along line A-A;

FIG. 19A shows a perspective view of an air drive assembly for rotating a drum matrix, according to one embodiment;

FIG. 19B shows an enlarged view of air drive assembly of FIG. 19A; and

FIG. 19C shows the swivel push bracket and rod clevis of the of air drive assembly of FIG. 19B.

DESCRIPTION OF PARTICULAR EMBODIMENTS

Specific details are hereby set out to provide examples of the claimed subject matter. However, the embodiments described below are not intended to define or limit the claimed subject matter.

In one embodiment, the at least one support member further defines a hole or recess for receiving a guide member, the guide being designed to be positioned in the hole or recess for aligning the at least one support member under the at least one knife.

In another embodiment, the at least one knife is connected to a knife actuator, the knife actuator displacing the at least one knife.

In a further embodiment, the at least one knife is movable by the actuator between a rest position and a cutting position by the knife actuator.

In one embodiment, the rest position is a raised position and the cutting position is a lowered position.

In another embodiment, the knife actuator comprises at least one of: a pneumatic actuator, a mechanical actuator, a thermal actuator, an electric actuator, and an hydraulic actuator.

In a further embodiment, the knife actuator is connected to a punch that comprises a plurality of knifes.

In one embodiment, the knife actuator is connected to a punch that comprises a manifold, the manifold distributing the fluid to the internal bore of the at least one knife, the at least one knife being connected to the punch.

In another embodiment, the manifold is defined within an internal portion of the punch and is in fluid flow communication with the internal bore of the at least one knife.

In a further embodiment, a plurality of knives are connected to the punch and the manifold distributes air to the plurality of knives, the manifold being in fluid flow communication with the internal bore of the knives.

In one embodiment, the punch includes an inlet for receiving a fluid such that the inlet is in fluid flow communication with the manifold, and wherein the manifold is in fluid flow communication with a plurality of outlets that are in fluid flow communication with the plurality of knives.

In another embodiment, the outlets comprise tubes for conducting the fluid from the manifold to the knives. In another embodiment, the at least one knife comprises a bias element for absorbing shocks and prevent damaging of the at least one knife.

In a further embodiment, a plurality of support members, each of the plurality of support members being matched with a corresponding knife.

In one embodiment, the internal bore longitudinally extends from the top of the at least one knife to the tip of the at least one knife.

In another embodiment, the at least one knife comprises a fluid inlet on a side surface that connects to the internal bore.

In a further embodiment, the fluid inlet is substantially located in the middle of the side surface of the knife.

In one embodiment, a supply section is provided, the supply section comprising a conveyor for carrying the support member.

In another embodiment, the device includes an actuator for displacing the conveyor or matrix drum.

In a further embodiment, the actuator includes one of: a pneumatic actuator, a mechanical actuator, a thermal actuator, an electric actuator, and a hydraulic actuator.

In another embodiment, the device further comprises an ejection section configured to receive the pitted element from the drupes; and a processed section designed to receive a pitted drupe.

In a further embodiment, the device further comprises a fluid injector for injecting the fluid into the support member to eject the pitted drupe therefrom.

In one embodiment, the at least one support member further comprises a first opening, the first opening being dimensioned to receive the drupe and the at least one opening being smaller than the first opening.

In another embodiment, the at least one opening is smaller in size than the drupe but larger than elements to be pitted from the drupe.

In one embodiment, the fluid is air.

In one embodiment, the fluid is water.

In one embodiment, the fluid is an inert gas (for example $N_2$ or Ar).

For example, the internal bore can be configured for permitting the fluid to pass through at a pressure of at least 90 psi or about 90 to about 120 psi.

For example, the internal bore can be configured for permitting the fluid to pass through at a pressure of at least 4.3 kPa or about 4.3 kPa to about 5.7 kPa.

For example, the internal bore can be configured for permitting the fluid to pass through at a pressure of at least 4 kPa or about 4 kPa to about 6 kPa.

For example, a shape of the at least one support member matches the shape of the at least one knife.

For example, the internal bore has a diameter of about 0.0625 to about 0.085 inches or about 0.05 to about 0.1 inches.

For example, the internal bore has a diameter of about 0.16 cm to about 0.22 cm or about 0.15 to about 0.25 cm.

For example, the diameter of the internal bore of the knife is about 15 to about 25%, about 15 to 20% or about 17% of the outer diameter of the knife.

For example, the knife has at least four blades radially extending from a cylindrical wall defining said internal bore of the knife.

For example, the knife has six blades radially extending from a cylindrical wall defining said internal bore of the knife.

For example, the tip of the knife defines a recess, an outlet in fluid flow communication with the internal bore being disposed into the recess defined by blades of the knife.

For example, depth of the recess is about half of the external diameter of the knife or less.

For example, the second opening has a concave shape with positive opening angles of at least 25 degrees or about 25 degrees to about 40 degrees.

For example, the device is effective for processing about 15 000 to about 18 000 drupes per hour, or about 10 000 to about 20 000 drupes per hour For example, the device can be effective for processing about 750 to about 1000 kg of drupes per hour or about 500 to about 1500 kg of drupes per hour For example, the device can have a weight of about 48 to about 72 pounds or about 40 to about 75 pounds.

For example, the device can have a weight of about 18 to about 33 kg or about 15 to about 35 kg.

For example, the device can occupy a volume of about 0.12 $m^3$ to about 0.15 $m^3$ or a volume of about 0.1 $m^3$ to about 0.2 $m^3$.

For example, the conveyor actuator is an electric motor and the knife actuator is a pneumatic actuator.

For example, the conveyor actuator is an electric motor and the knife actuator is an electric motor.

For example, the conveyor actuator and the knife actuator is the same.

For example, the conveyor actuator and the knife actuator is the same electric motor.

For example, the conveyor actuator and the knife actuator is the same pneumatic actuator.

For example, the conveyor actuator is a pneumatic actuator and the knife actuator is a pneumatic actuator.

For example, the drupes can be cherries.

In one embodiment, the method for pitting drupes comprises:
placing the at least one drupe on the supporting member comprising the at least one opening;
aligning the supporting member and the knife by inserting a guide into a recess or hole defined in the supporting member; and
inserting a knife into the at least one drupe and injecting a fluid through a tip of the knife to eject a pit and/or residues out of the drupe and through said at least one opening.

In another embodiment, the method for pitting drupes comprises:
placing the at least one drupe on the supporting member comprising the at least one opening;
aligning the supporting member and the knife by inserting a guide into a recess or hole defined in the supporting member;
inserting a knife into the at least one drupe and injecting a fluid through a tip of the knife to eject a pit or residues out of the drupe and through said at least one opening;
removing the knife from the drupe; and
removing the guide from the recess or hole.

For example, the method also includes aligning the support member and the at least one knife such that the at least one knife can be inserted into the at least one drupe.

In one embodiment, the period of time during which the guide is inserted into the recess or hole lasts longer than a period of time during which the knife is inserted into the at least one drupe.

In another embodiment, the method for pitting drupes further comprises:
passing the at least one drupe through a first opening of the supporting member and placing the at least one drupe on a second opening of the supporting member that is smaller in size than the at least one drupe
aligning the supporting member and the knife by inserting a guide into a recess or hole defined in the supporting member;
passing the knife through the first opening of the support member, inserting the knife into the at least one drupe, injecting a fluid through the tip of the knife to eject a pit and/or residues out of the drupe and through the second opening of the support member;
removing the knife from the drupe; and
removing the guide from the recess or hole.

In one embodiment, the method for pitting drupes further comprises injecting a fluid through the second opening of the support member to eject the drupe therefrom.

For example, the fluid can be injected into the second opening at a pressure of at least 90 psi or about 90 psi to about 120 psi.

For example, the fluid can be injected into the tip of the knife at a pressure of at least 90 psi or about 90 psi to about 120 psi For example, the knife can be inserted into the at least one drupe at a pressure of at least 80 psi or about 80 psi to about 300 psi.

For example, the fluid can be injected into the second opening at a pressure of at least 4.3 kPa or about 4.3 kPa to about 5.7 kPa.

For example, the fluid can be injected into the tip of the knife at a pressure of at least 4.3 kPa or about 4.3 kPa to about 5.7 kPa.

For example, the knife can be inserted into the at least one drupe at a pressure of at least 3.8 kPa or about 3.8 kPa to about 14.3 kPa.

For example, the method further includes injecting a fluid into a knife actuator that is a pneumatic actuator, the pneumatic actuator being connected to the at least one knife, to move the at least one knife between a rest position and a cutting position, such that in the cutting position the at least one knife is inserted into the at least one drupe.

For example, the method further includes injecting a fluid into a conveyor actuator that is a second pneumatic actuator, the second pneumatic actuator being connected to the support member, to displace the support member.

For example, the method further includes:
injecting a fluid into a knife actuator that is a pneumatic actuator, the pneumatic actuator being connected to the at least one knife, to move the at least one knife between a rest position and a cutting position, such that in the cutting position the at least one knife is inserted into the at least one drupe; and
activating a conveyor actuator that is an electric motor actuator to displace the support member, the electric motor actuator being connected to the support member such that when activating it causes the support member to move.

For example, the method further includes:
activating a knife actuator that is an electric motor actuator to the at least one knife, the electric motor actuator being connected to the at least one knife, to move the at least one knife between a rest position and a cutting position, such that in the cutting position the at least one knife is inserted into the at least one drupe; and
activating the electric motor actuator to displace the support member, the electric motor actuator being connected to the support member such that when activating it causes the support member to move.

For example, the method further includes:
injecting a fluid into a knife actuator that is a pneumatic actuator, the pneumatic actuator being connected to the at least one knife, to move the at least one knife between a rest position and a cutting position, such that in the cutting position the at least one knife is inserted into the at least one drupe; and
injecting a fluid into a conveyor actuator that is a second pneumatic actuator to displace the support member, the second actuator being connected to the support member such that when the fluid is injected into the second actuator, it causes the support member to move.

For example, the knife actuator includes at least one of a pneumatic actuator, a mechanical actuator, a thermal actuator, an electric actuator, and an hydraulic actuator.

For example, the knife actuator is connected to a punch that comprises a manifold, the manifold distributing the fluid to the internal bore of each of the at least one knife, the at least one knife being connected to the punch.

For example, the manifold is defined within an internal portion of the punch and is in fluid flow communication with the internal bore of the at least one knife.

For example, a plurality of knives are connected to the punch and the manifold distributes air to the plurality of knives, the manifold being in fluid flow communication with the internal bore of the knives.

For example, the punch includes an inlet for receiving a fluid such that the inlet is in fluid flow communication with the manifold, and wherein the manifold is in fluid flow communication with a plurality of outlets that are in fluid flow communication with the plurality of knives.

For example, the method further includes injecting the fluid into the manifold such that said fluid is distributed to the at least one knife and injected through the tip of the at least one knife.

For example, the method further includes activating a second actuator to move the support members.

For example, the second actuator comprises one of: a pneumatic actuator, a mechanical actuator, a thermal actuator, an electric actuator, and a hydraulic actuator.

For example, the fluid is air.

For example, a process for manufacturing the device includes using know and common technique for manufacturing similar devices.

For example, a process for manufacturing the device includes using means and/or techniques described in the present application.

For example, a process for manufacturing the device includes cutting, welding, screwing, gluing, snap fitting, nesting and/or riveting constituting elements of the device.

It will be appreciated that, for simplicity and clarity of illustration, where considered appropriate, reference numerals may be repeated among the figures to indicate corresponding or analogous elements or steps. Numerous specific details are set forth in order to provide a thorough understanding of the exemplary embodiments of the subject matter described herein. However, it will be understood by those of ordinary skill in the art that the embodiments described herein may be practiced without these specific details. In other instances, well-known methods, procedures and components have not been described in detail so as not to obscure the present subject matter. Furthermore, this description is not to be considered as limiting the scope of the subject matter in any way but rather as illustrating the various embodiments.

Figure 1B:
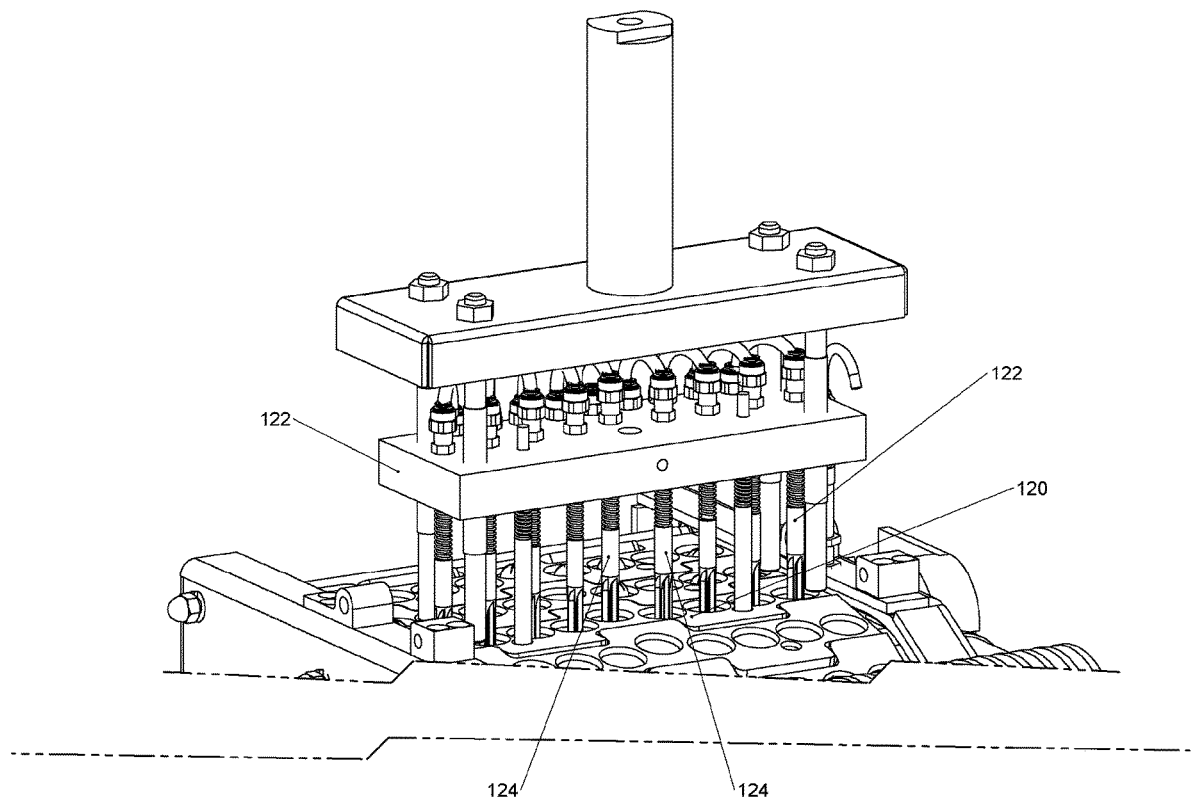
FIG. 1B is an enlarged perspective view of a transformation section of the apparatus of FIG. 1A.
Figure 1C:
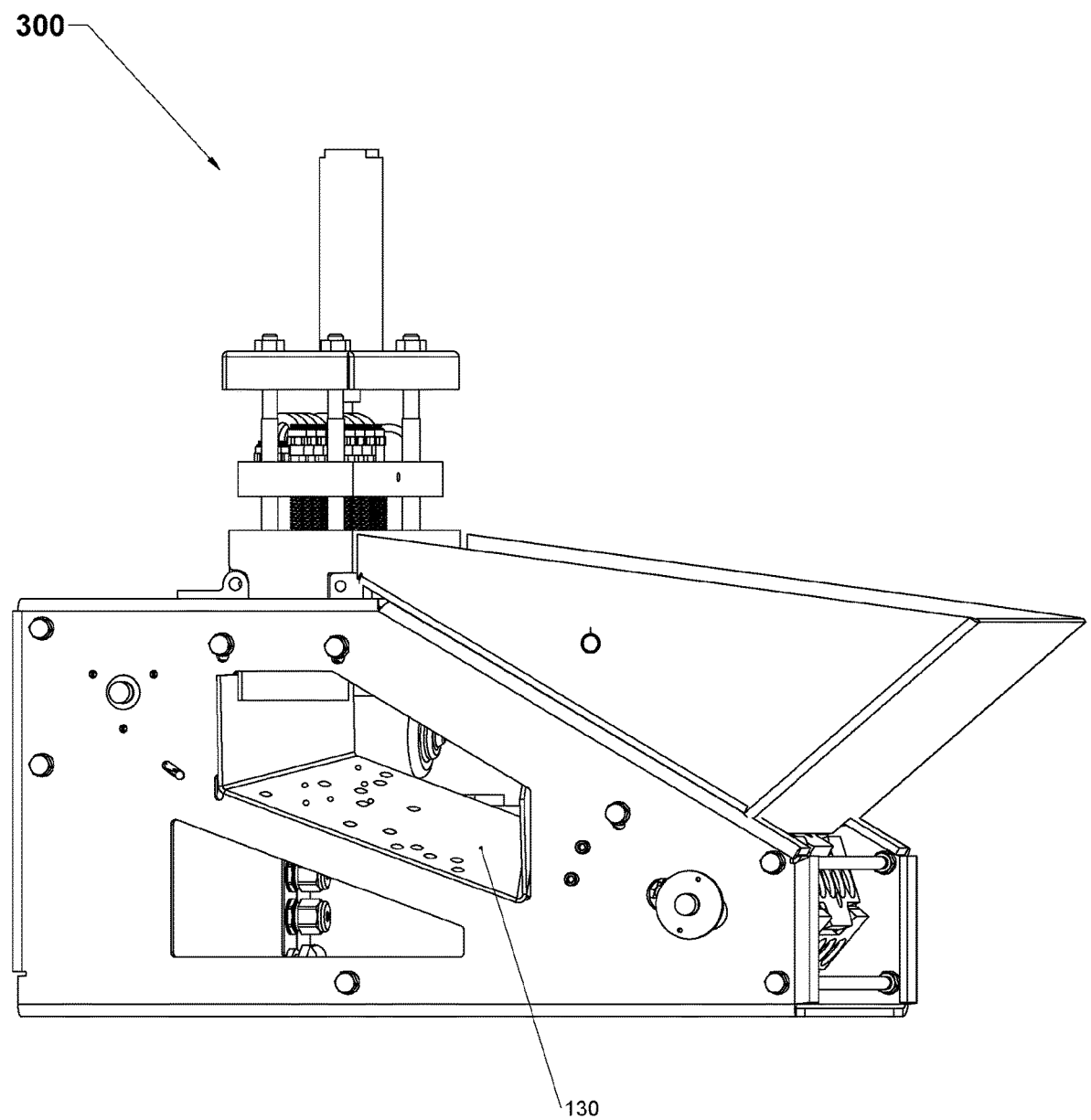
FIG. 1C is a perspective view of an ejection section of the apparatus of FIG. 1A.
Figure 1D:
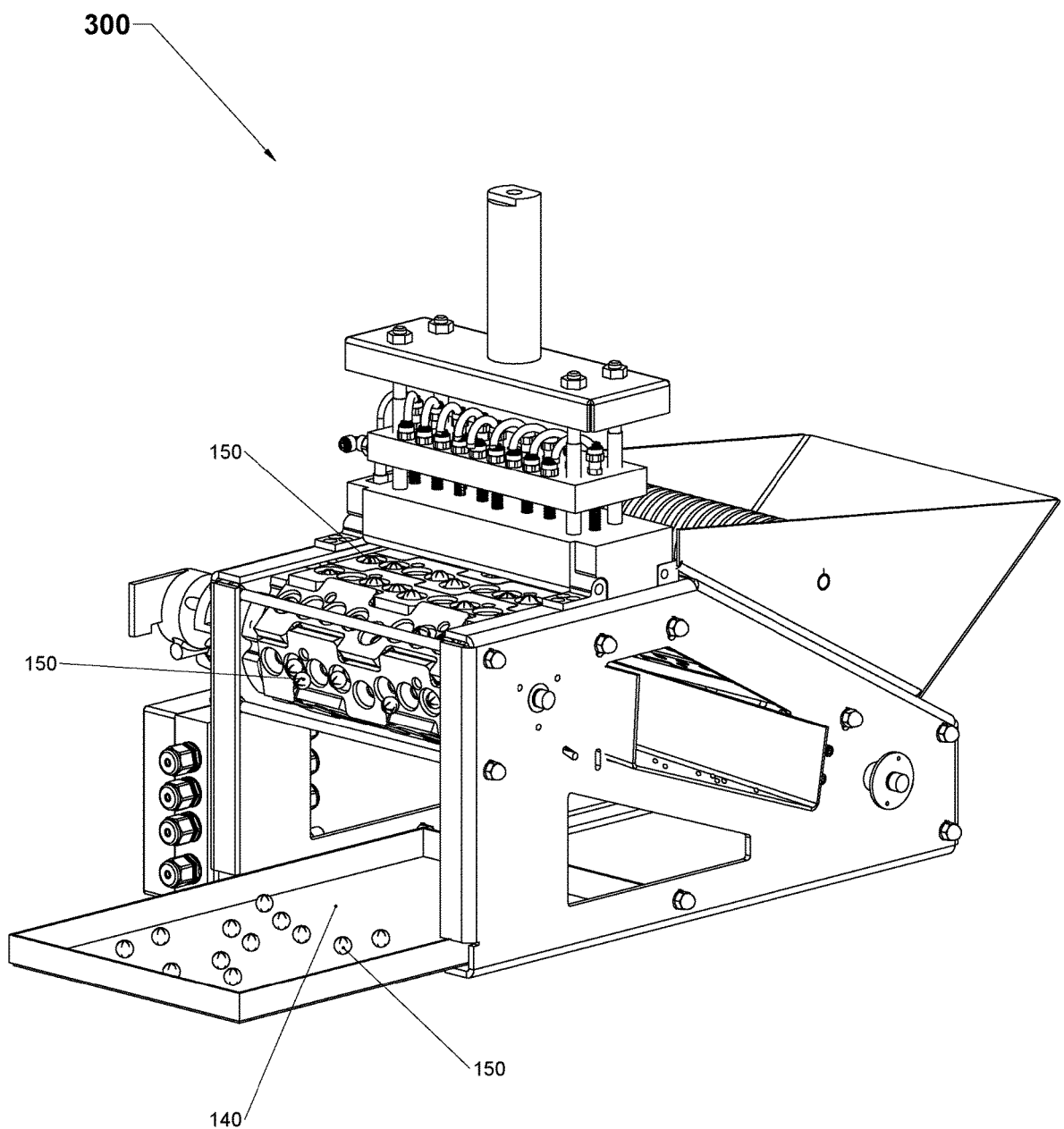
FIG. 1D is a perspective view of a processed section of the apparatus of FIG. 1A.

Embodiments of an apparatus for pitting drupes is shown in FIGS. 1A, 1B, 1C and 1D. The apparatus for pitting drupes may have a supply section as shown in FIG. 1A. The apparatus for pitting drupes may have a transformation section as shown in FIG. 1B. The apparatus for pitting drupes may have an ejection section as shown in FIG. 1C. The apparatus for pitting drupes may have a processed section as shown in FIG. 1D.

In one embodiment, the apparatus for pitting drupes can be portative. The apparatus for pitting drupes can also be light. In one embodiment, the apparatus for pitting drupes can process about 15 000 to about 18 000 drupes per hour. In one embodiment, the apparatus for pitting drupes can process about 750 to about 1000 KG of drupes per hour.

The apparatus for pitting drupes can be washed at the end of each pitting session with water and a light soap if possible to eliminate any chance of contamination, specifically contamination by sugar which creates a bonding and unwanted accumulation if it dries. For example, the conveyor as well as the support members can be washed after used. For example, the knives can be cleaned after use.

A drupe can be a fruit containing one or more pits. The drupe may contain a central core. The drupe may contain a stone or multiple stones. For example, the drupe may contain a central stone containing one or more seeds. The drupe can be a food item containing one or more pits.

Examples of a drupe, fresh or frozen, are a coffee bean, a jujube, a mango, an olive, a pistachio, an almond, an apricot, a cherry, a sea buckthorn, a damson, a nectarine, a peach and a plum.

As shown in FIG. 1A, the supply section 103 is configured to receive drupes. For example, drupes can be inserted into a conveyor in the supply section manually by a person. As another example, drupes can be automatically inserted into the conveyor in the supply section. The conveyor may have one or more support members to receive the drupes. In one embodiment, the support member may have at least one opening. In another embodiment, the support member also have a first opening.

The conveyor may also have one or more holes for aligning the support members.

An exemplary embodiment of the conveyor is shown in FIG. 2A. The conveyor may have one or more support members. Two or more support members can be located on a matrix, for example matrix 202. A conveyor may include one or multiple matrixes. Exemplary embodiments of the matrix 202 are shown in FIGS. 2B, 2C, 2D and 2E.

The matrixes can be machined or molded plastic parts. The matrixes can be interconnected in a continuous loop to form a chain, such as the conveyor. For example, two matrixes are put together with a conveyor rod 203 that is inserted in a longitudinal pass way hole of the matrix at front end with three "shoulders" of one matrix and back end with two "shoulders" of another matrix to form a male female bond. A snap ring may hold the two matrixes and the conveyor rod together so that the rod don't slide out. For example, snap rings 201 are used to retain the conveyor rods within the limit edges of the matrixes 202, and to secure them from being pushed out.

Each matrix may have holes for aligning the support members. For example, the matrix 202 has two alignment holes that guides piston guides to align perfectly before knives enter the support members designed to receive the fruit. The tip of the piston guides may have a spherical shape to enter smoothly into the guided holes of the matrixes 202 that also have a chamfer to make it smoother for entry if a slight misalignment occurs. FIG. 2C shows a cross section of the matrix 202 shown in FIG. 2B along line A-A.

A support member is located in the matrix 202. The support member is designed to receive the drupes. The support member may have at least one opening. In embodiment, the one opening can be smaller in size than the drupe and dimensioned to allow the pitted element to exit the drupe.

The support member may also have a first opening and a second opening. In one embodiment, the first opening is dimensioned to receive the drupes and the second opening is smaller than the first opening. By being smaller than the first opening, the second opening may prevent a part of the meat of the drupe (e.g. fruit) to be removed along with the pit. The second opening can be dimensioned to allow the pitted element to exit the drupe. The second opening can be smaller in size than the drupes. The second opening can be narrower than the first opening. But, the second opening is larger than elements to be pitted from the drupes. For example, the pit of the drupe exits the drupe and the support member through the second opening.

In one embodiment, the second opening may not be smaller than the largest pit length. For example, let's assume that the minimum diameter for a sour cherry is about 0.460 inches (about 1.17 cm). The second opening may have a concave shape with positive opening angles of a minimum 25 degrees. For example, it can be 32 degrees.

Returning to FIGS. 1A, 1B, 1C and 1D, there is shown an apparatus 300 for pitting drupes. A retaining bin 105 keeps the drupes from falling and directs them into the conveyor 107. The conveyor 107 rotates and brings the drupes to the transformation section 120. The conveyor may bring the drupes to transformation section 120 with a raised angle to help the drupes fall by gravity while displacing. A conveyor brush 109 helps to push back fruits that have not fallen into support members of the matrixes until they fall into an empty one.

The transformation section 120, as shown in FIG. 1B, is where a pit or pitted element is removed from a drupe. For example, the drupe can be a fruit, such as a cherry and the pit or pitted element can be the core (or nucleus) of the cherry. The transformation section may include a punch having a piston with a knife. The transformation section may include a guide for aligning the knife over the drupe. For example, the guide can be designed to be positioned in holes in the conveyor for aligning the support member and the drupe under the knife.

For example, as shown in FIG. 1B, the transformation section includes a plurality of punch elements 122. Each punch element 122 is composed of a piston with a knife 124.

The knife may define an internal bore. The internal bore permits a fluid to pass through the tip of the knife. The fluid passing through the internal bore also favors ejection of a pitted element from a drupe. The internal bore may cross an internal section of the knife in an axial direction from the top of the knife to the tip of the knife. In one embodiment, the knife has a fluid inlet on its external side surface. This fluid inlet connects to the internal bore of the knife. A fluid may pass through the fluid inlet on the side surface of the knife to the internal bore to facilitate ejection of a pitted element from a drupe.

In one embodiment, the fluid inlet is substantially located in the middle of the side surface of the knife. The opening may cross the knife in the radial direction to connect to the internal bore. The opening may cross the knife in an oblique direction to connect to the internal bore. The oblique direction may facilitate the flow of the fluid passing through the opening and the internal bore to come out of the tip of the knife.

The punch 122 is designed to have a knife 124 (or pitting rods) that transpierce the drupe and extract the core by a downward motion.

The core of the drupe falls into the ejection section 130 as shown in FIG. 3. The ejection section 130 is configured to receive the pitted elements front the drupe, once in the ejection section 130, the core can no longer be mixed with the drupes. The ejection section has no contact with the rest of the apparatus. It is important the pits (or stones) (or cores) stay separated from the fruits in order to have a pit free product.

The punch 122 comes back up. The pitted fruits 150 fall into the processed section 140. A fluid injector located under the conveyor may eject a fluid under the conveyor to push the pitted drupes into the processed section. The fluid can be air.

The processed section 140 is designed to receive the pitted drupes. The processed section 140 is where the pitted drupes (e.g. fruits without a core or pit) are collected. In one embodiment, the processed section is a simple pan that is manually managed. In a further embodiment, the processed section can be directed somewhere else by a conveyor.

The next row of unpitted fruits arrives into the transformation section for another cycle.

Referring to FIG. 3, there is shown an apparatus 300 for pitting drupes. The apparatus 300 has a frame 301. The frame 301 is the main supporting structure of the apparatus 300 to which all other elements are attached. All elements of the apparatus are attached to the frame 301 by screw connections or retaining rings.

A motor 305 is mounted on the frame 301. The motor 305 can be an AC or DC motor. For example, the motor can be an AC induction motor, an electromagnetic AC motor, etc. The motor can be directly or indirectly connected to a conveyor chain to rotate the conveyor chain. In FIG. 3, the motor 305 rotates the conveyor chain 107. For example the conveyor can be connected to wheels which are driven by the motor.

In one embodiment, the motor has a voltage of 12 volts, a current of about 20A to about 30A, and a frequency of at least 100 Hz.

In one embodiment, the motor is DC driven. It can be used with a battery. The main advantage of a DC driven motor is that it activates and deactivates instantly. The DC motor may have accurate and quick starting, stopping, reversing and acceleration.

The conveyor chain 107 has support members to receive drupes. The conveyor chain 107 carry the fruits to all four stations, namely the supply section, the transformation section, the ejection section and the processed section. The conveyor chain 107 consists of 3 components: matrixes, conveyor rods and retaining rings. The matrixes are interconnected together by means of conveyor rods that are hinged holding two matrixes and two retaining rings locks the rods at both ends so they don't slide out. The advantage of this type of assembly is to maintain a fit connection to assure the movement of the matrix around the axis of the rods in a near friction less movement. It enables the conveyor chain 107 to follow its looped motion without constraints. The conveyor chain is pulled by gears by the engagement of the conveyor rods into the gear teeth's. It than gets free until being redirected in a rotational pass way by the rods rolling around the driven wheel. Chain guides may assure a parallel pathway of the chain before entering into the pitting section.

The conveyor chain 107 is compact and light weight matrixes with maximized positioning of support members. The support members receive the drupes. The support member may have at least one opening. The one opening may allow pitted elements to exit the support member. The one opening can be smaller in size than the drupes but larger than elements to be pitted from the drupes.

The support member may also have a first opening. The first opening can be dimensioned to receive drupes.

The conveyor chain 107 has holes for alignment of pistons located in the punch 303. Therefore, knives located in the punch 303 may align in their descent by the means of piston guides.

The punch 303 is attached to the frame 301 by screw connection, for example, through hinges and/or punch locks. The punch 303 is the transformation section, where the knives transpierce drupes located in the support members of the conveyor chain 107. When a knife transpierce a drupe, the pit (core) or pitted element of the drupe is dislodged from the fruit. The second opening of the support member allows the pitted element to exit the support member.

Figure 6A:
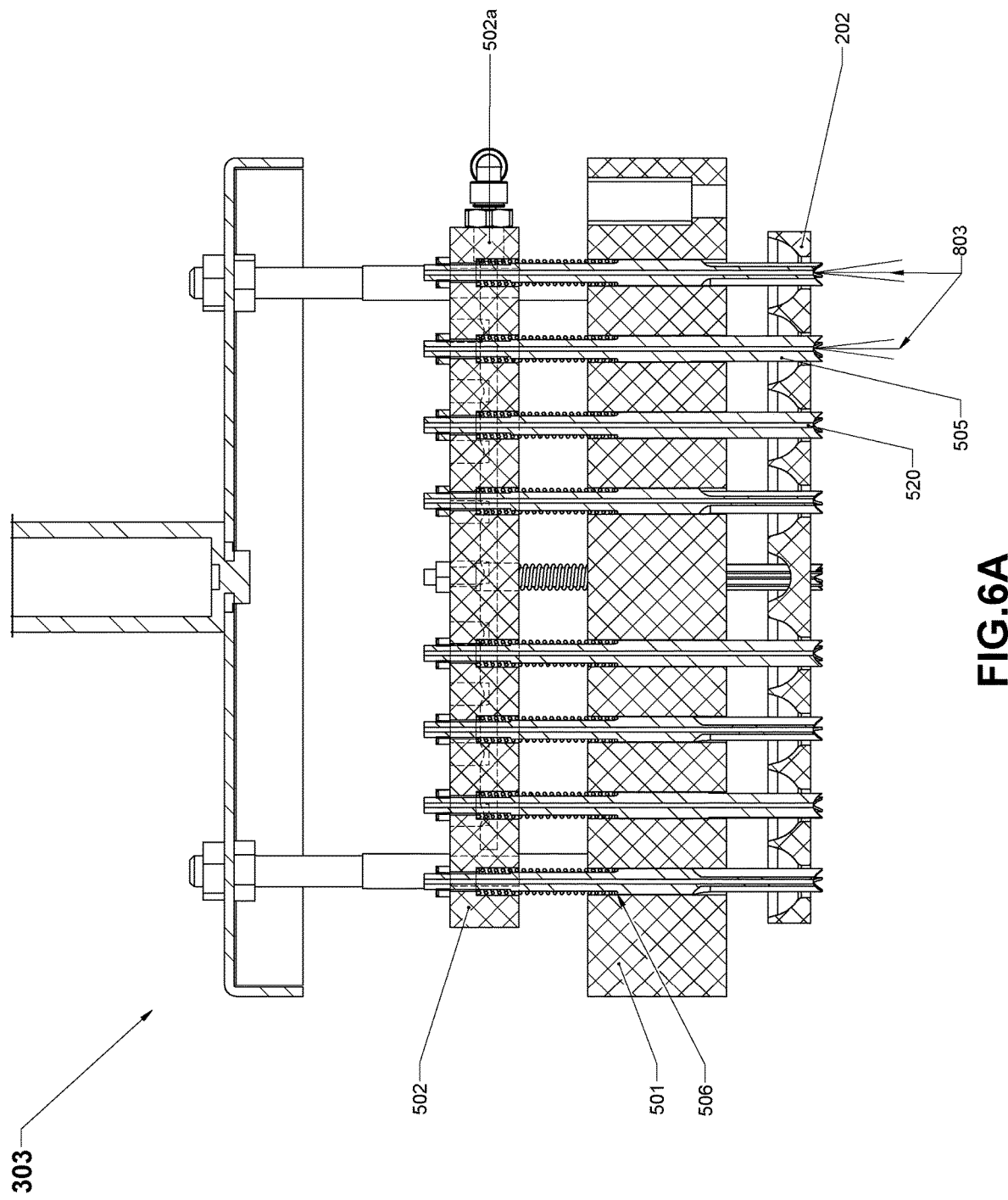
FIG. 6A is a cross section view of a punch connected to knives having an internal bore in the longitudinal direction according one embodiment.

The knives in the punch 303 may have an axial bore through all their length. For example, a fluid (air) supply goes through the punch piston that can also acts as a manifold for air passage 502a as shown in FIG. 6A and then through air tubes connected to the knives. The air than goes through the knives and a jet is pushed at the end of the downward stroke to push left over pits, flesh or pulp into the ejection section.

For example, a knife actuator can be connected to a punch that includes a manifold, the manifold distributing the fluid to the internal bore of the knives. For example, the manifold can be defined within an internal portion of the punch and is in fluid flow communication with the internal bore of the knives. For example, a plurality of knives can be connected to the punch and the manifold distributes air to the plurality of knives, such that the manifold is in fluid flow communication with the internal bore of the knives.

For example, the punch includes an inlet for receiving a fluid such that the inlet is in fluid flow communication with the manifold. For example, the manifold is in fluid flow communication with a plurality of outlets that are in fluid flow communication with the plurality of knives. For example, the outlets include tubes for conducting the fluid from the manifold to the knives.

The knives may comprise a bias element for absorbing shocks and prevent damaging of the knives. The bias element can be a spring. For example, the knives can be attached to a spring with constant loaded pressure, which permits the knives to have a stroke if any object interferes. This is a protection for the knives but also the complete system. There are piston guides that are longer than the knives that also have springs with loaded pressure and a shorter stroke but they guide the punch piston and assure that all the knives align properly through the support members of the conveyor chain 107.

A food slide 105 is bolted on the frame 301 and is used to keep the drupes from falling. It is the feeding part of the machine where the drupes are inserted. The food slide 105 guides the drupe toward the conveyor chain 107. It is part of the supply section.

A pit slide 130 is attached to the frame 301. For example, the pit slide 130 is attached to the frame 301 by screw connection. The pit slide 130 is located in the ejection section. The pit slide 130 is the pass way where the pit (core), flesh and leftover pulp go to after the pitting (coring, destoning) action. The pit slide 130 has multiple functions. It is the area where the pits are ejected. It is designed to be isolated from any pathways the drupes take.

A wiper 311 is attached to the chain guide (407, 408) with screw connection. It touches the bottom part of the support members of the conveyor chain a few centimeters after the knives go through the support member opening. The wiper 311 wipes by friction any pits or residues that may get stuck or have not fallen by gravity on the conveyor chain.

A conveyor brush 109 is attached to the frame 301. For example, the conveyor brush 109 is installed on the drupe slide 105 with small bolted bushings or can also be attached to the frame 301 by means of brackets. The conveyor brush 109 helps to push back drupes, such as fruits, that have not fallen into a support member of the conveyor chain until they fall into an empty one. For example, the conveyor brush 109 pushes fruits that have not entered into a support member back down the sloped conveyor into the supply section.

Air is fed to the frame 301 through the air junction sub assembly 307. The air junction sub assembly 307 includes a box that is bolted on the frame 301. The air junction sub assembly 307 contains the pneumatic components and cables for feeding air to the frame 301. The air junction sub assembly 307 contains components that direct the fluid flow towards the knives and the fluid injector. For example, the air junction sub assembly 307 directs air to the punch piston and to the knives. For example, the air junction sub assembly 307 directs air to the fluid injector located under the conveyor to eject an air jet under the conveyor to push the pitted drupes into the processed section. The air junction sub assembly 307 is housed in a sealed waterproof box with cable and hose connectors that are also waterproof.

An electrical junction box 310 can be connected to the air junction sub assembly 307. The electrical junction box 310 includes mainly the PLC, the power supplies, relays, motor controller, fuses and all connections for the functioning of the machine (or apparatus). The electrical junction box 310 manages the sequences, feeds, speeds, torques and velocity of the complete system. The electrical junction box may have a voltage supply of 120 volts.

The electrical junction box 310 includes all the cables and wires that need to go to the machine for the power, sensors, actuators and more. All those wires are terminated on a quick connect plug 320. The quick connect plug 320 is used to quickly connect and disconnect the machine from the electrical junction box 310. For example, when the operator needs to wash the machine, he can rapidly disconnect the plug and go wash the machine with no worries of damaging the electrical portion of the machine. The electrical junction box 310 manages the sequences, feeds, speeds, torques and velocity of the complete system.

The electrical junction box 310 can be easily connected and disconnected for transporting the machine to a washing station without worrying to damage electrical components. The electrical junction box 310 is sealed and waterproof. The components that are inside the electrical junction box 310 do the complete management of the system and every actuator, motor, sequence, timing, speed of the machine can be adjusted at any time. The PLC has a pre-determined program.

Figure 4A:
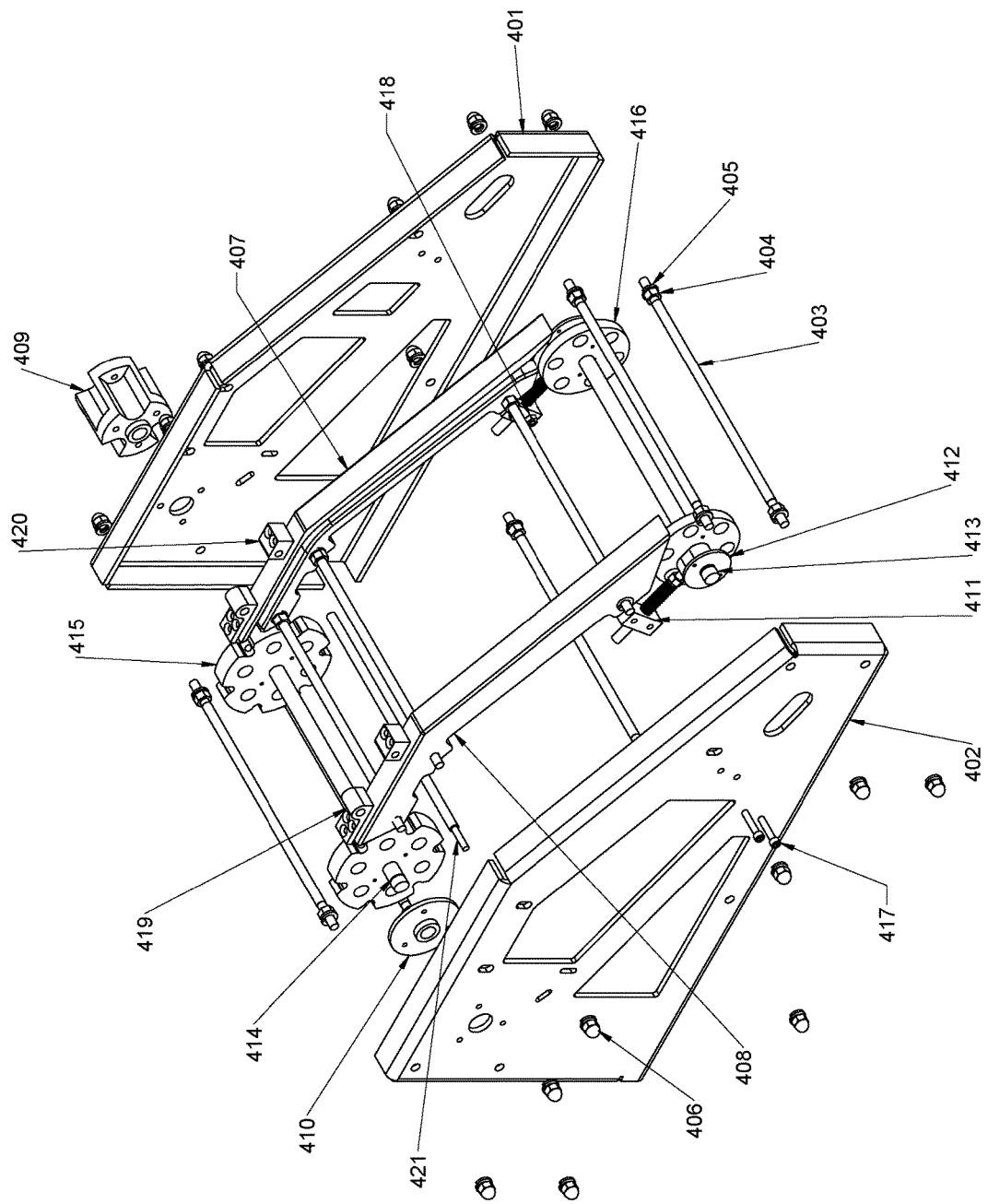
FIG. 4A is an exploded view of a frame of an apparatus for pitting drupes according to one embodiment.

FIG. 4A shows an exploded view of the frame. The frame has a right frame 401 and a left frame 402. The frame is made from metal or plastic with predetermined shapes and holes. Parts can be installed on it. In one embodiment, the frame is made of a transparent plastic. This has a lightweight advantage. This also allows to see inside the machine if everything is going well and no residue is left after cleaning.

The frame has rods 403. The rods 403 are used to fix the right frame 401 and the left frame 402 together. Three rods are installed at the same time as the right chain guide 407 and left chain guide 408.

The frame has nuts. The nuts can be Hex nuts and Cap nuts. As shown in FIG. 4A, the nuts are Hex 404 nuts and Cap nuts 406. The Hex nuts 404 are on the inside of the frame. There is no need to fasten before installing rods on the right frame 401 and the left frame 402. The Cap nuts 406 are fasten on the outwards of on the right frame 401 and the left frame 402 after the split lock washers 405. They tight the frame subassembly.

The frame has split lock washers 405. For example, the split lock washers are in the inside of the frame and may need to be fastened before installing rods on right frame 401 and the left frame 402. The split lock washers may go outside the frame.

The frame has a right chain guide 407 and a left chain guide 408. The chain guides are used to guide the chain during its movement. The rods 403 of the conveyor chain slide inside the raceway of the guides during a portion of the cycle. The guide ends after the punch. At the end of the guide, the gear 415 rotates and pulls the conveyor chain.

The frame has a motor support 409. The motor support 409 is centered and fixed by screw connection on the right frame 401. It has 2 main functions. First, it is made of low coefficient material (e.g. nylon) and it is used as a bushing for the motor shaft 414. The motor may mounted on the motor support 409 by screw connection. It is maintained in place between the gear 415 and a retaining ring installed at both end of the motor shaft. The motor support 409 is also used as a bushing. The main advantage is that there are less parts necessary to install in order to satisfy those functions (bearing, bearing holder, motor support).

The frame has a front busing 410. The front bushing 410 is centered and fixed by screw connection on the left frame 402. It can be made of low coefficient material (e.g. nylon) and it is used as a bushing for the motor shaft 414.

The frame has a chain tension block 411. The tension blocks 411 are installed by screw connection 417 and 418 to the right frame 401 and the left frame 402. They are used as a guide for the tensioning rod but also as a stopper for the spring that is adjusted by a nut.

The frame has a back bushing sub assembly 412. The back bushing sub assembly 412 is used for inserting from the inside of the right frame 401 and the left frame 402 and is guided by the opening of the frame and the tension block 411 to have an axial free movement. It is made of low coefficient material (e.g. nylon) and it is used to be a bushing for the driven shaft 413. It is maintained in place between the driven wheel 416 and a retaining ring installed at both end of driven shafts 413. The back bushing sub assembly 412 has a bushing used for the driven shaft 413. It has a guide pin used in relation with the chain tension block 411. It has a spring tension adjustment for the conveyor belt, which can be adjustable with a nut.

The frame has a driven shaft 413. The driven shaft 413 is inserted in both back bushing 412 and held in place by 2 retaining rings at the extremities. Two driven wheels 416 are positioned and tighter with a set screw at a determined place on the shaft.

The frame has a motor shaft 414. The motor shaft 114 is inserted in both front bushing 410 and motor support 409 and is held in place by 2 retaining rings at the extremities. Two gears 415 are positioned and tighter with a set screw at a determined place on the shaft.

The frame has gears 415. The gears 415 drive the conveyor chain. The motor activates the rotation of the motor shaft 414. The gears 415 are connected by set screws to a determined position on the motor shaft 414 and they engage the conveyor rods by a pulling in a rotational motion. This motion pulls the conveyor chain in a linear motion. The matrixes are connected to the conveyor rods to form a continuous chain. This chain rotates continuously as the sequence of the machine goes on. After the conveyor rods leave the gears, they go towards the driven wheel 416 freely without touching anything.

In one embodiment, the gear 415 is custom machined; it is specific to the pitch that is needed for the conveyor chain. It has direct interaction with the conveyor rods that are inserted in the matrixes which creates better precision compared to a bolted indirect connection.

The frame has driven wheels 416. The driven wheels 416 are connected by set screws to a determined position on the driven shaft 413. They are meant to guide and redirect the conveyor chain. The conveyor rods (203) roll around the driven wheel while the conveyor chain rotates. After leaving the driven wheel 416, the conveyor rods than enter the chain guides raceway 407 and 408.

The frame has screws 417 (such as screw SST 0.25"-20nc×1.25"). They are used for holding the chain tension block 411. The frame also has locknuts 418 (such as locknut thin SST 0.25"). They are used to fasten the chain tension block 411.

The frame has hinges 419. The hinges 419 are fixed by screw connection to both right and left frame 401 and 402 at a pre-determined place. The punch can be fixed by bolt connection on both sides. The punch may therefore rotate towards the back for maintenance, cleaning or inspection of knives. The complete punch can be pivoted 90 degrees toward the back in order to inspect the knives tips and also to clean.

The frame has punch locks 420. The punch locks 420 can be fixed by screw connection to both right and left frame 401 and 402 at a pre-determined place. The punch is fixed by bolt connection on both sides. The punch may therefore be locked in place for normal operation position (vertical).

The frame has a fluid injector 421. The fluid injector 421 is meant to push a fluid, such as an air jet, into the small whole part of the matrix support members (alveolis) where the knives go through. The fluid injector 421 pushes air burst to eject drupes stuck in the support members of the conveyor chain. This passage connects with the pitted drupes. Normally most drupes (e.g. fruits) may fall by gravity but sometimes they get stuck or stick into the support members. The air jet is used to push off the leftover drupes (e.g. fruits) that stayed on the matrixes.

Figure 4B:
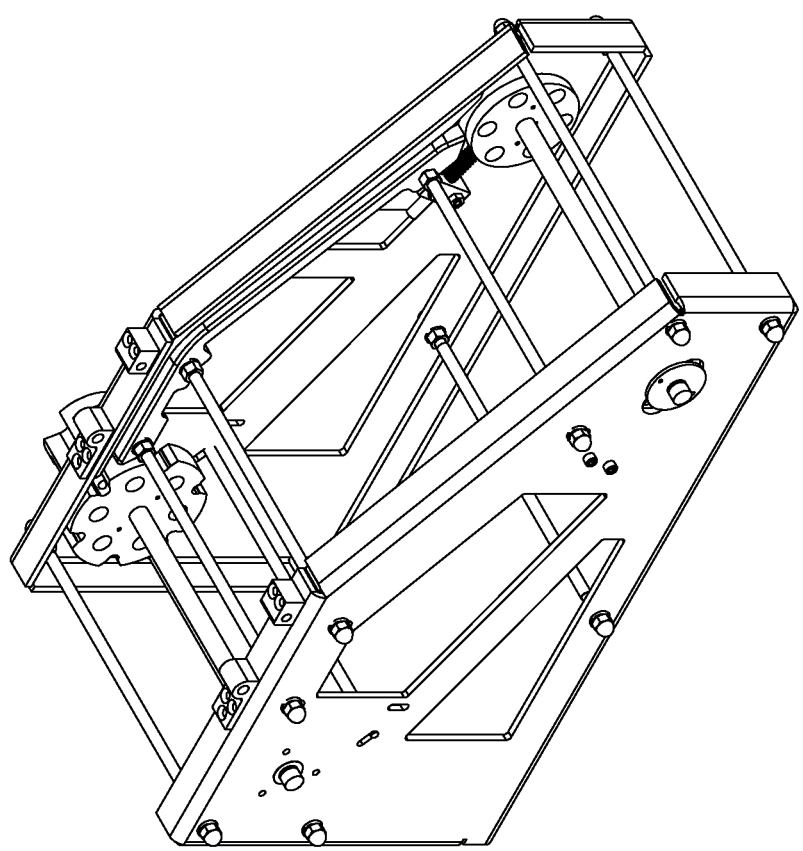
FIG. 4B is a perspective view of the frame of FIG. 4A.

FIG. 4B shows the assembled view of the frame.

Figure 4C:
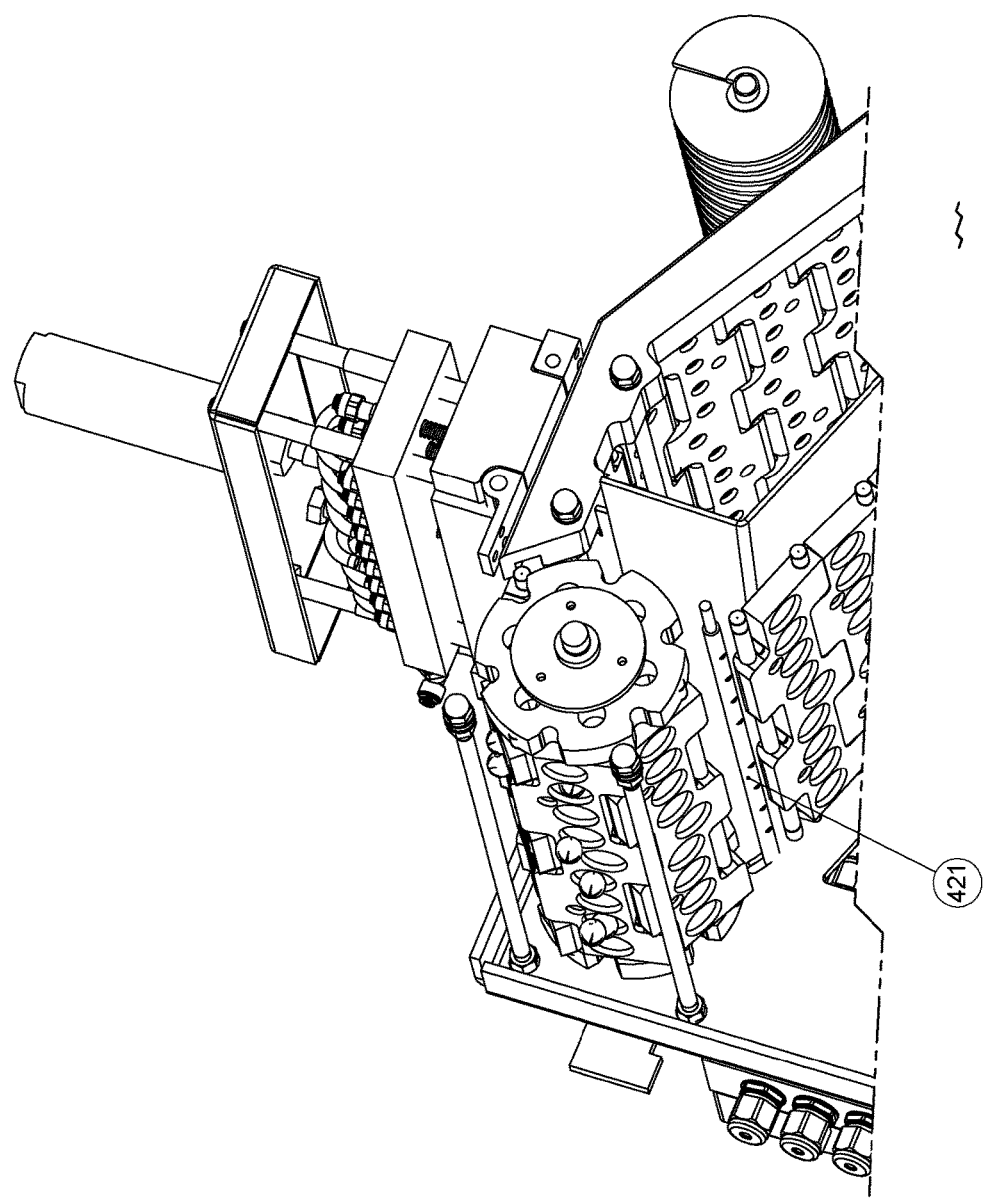
FIG. 4C is a perspective view of the fluid injector of FIG. 4A when mounted on of an apparatus for pitting drupes.

FIG. 4C shows the fluid injector 421. The fluid injector 421 pushes air burst into the support members of the conveyor chain to eject drupes that are stuck after being pitted.

Figure 5A:
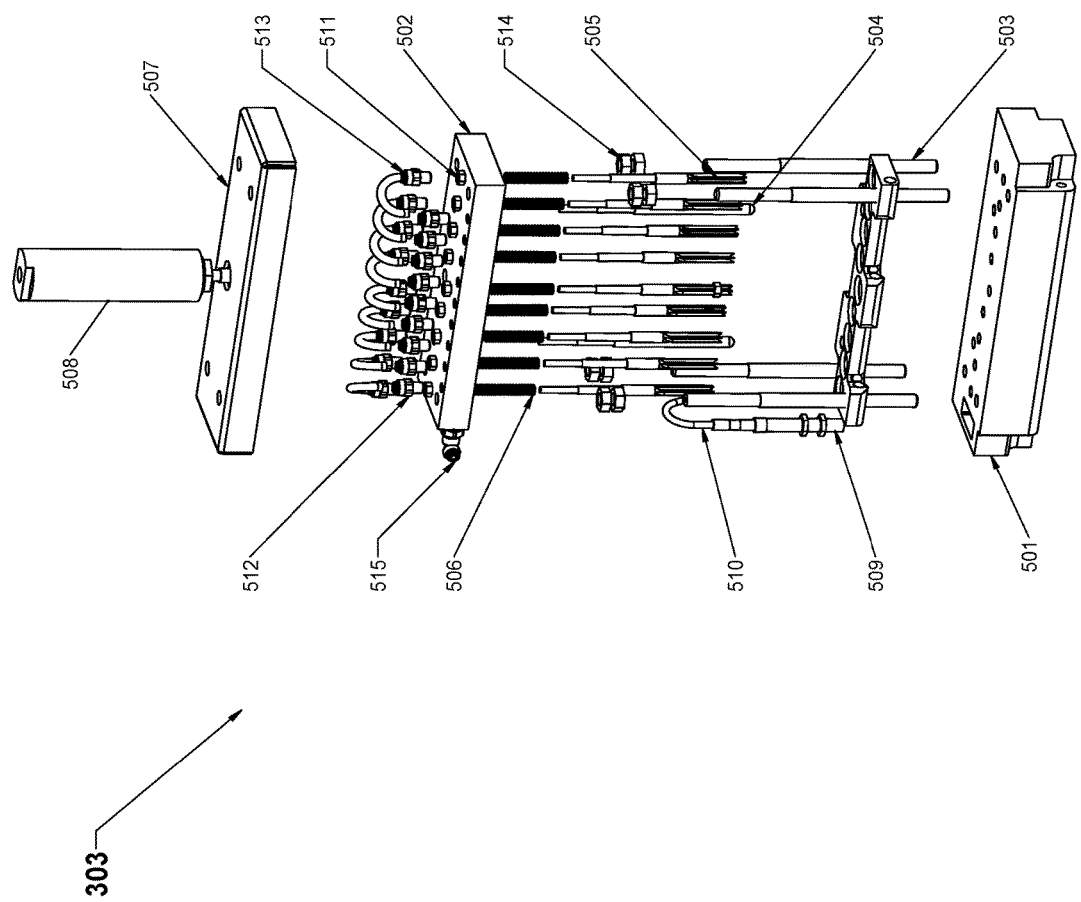
FIG. 5A is an exploded view of a punch of an apparatus for pitting drupes according to one embodiment.
Figure 5B:
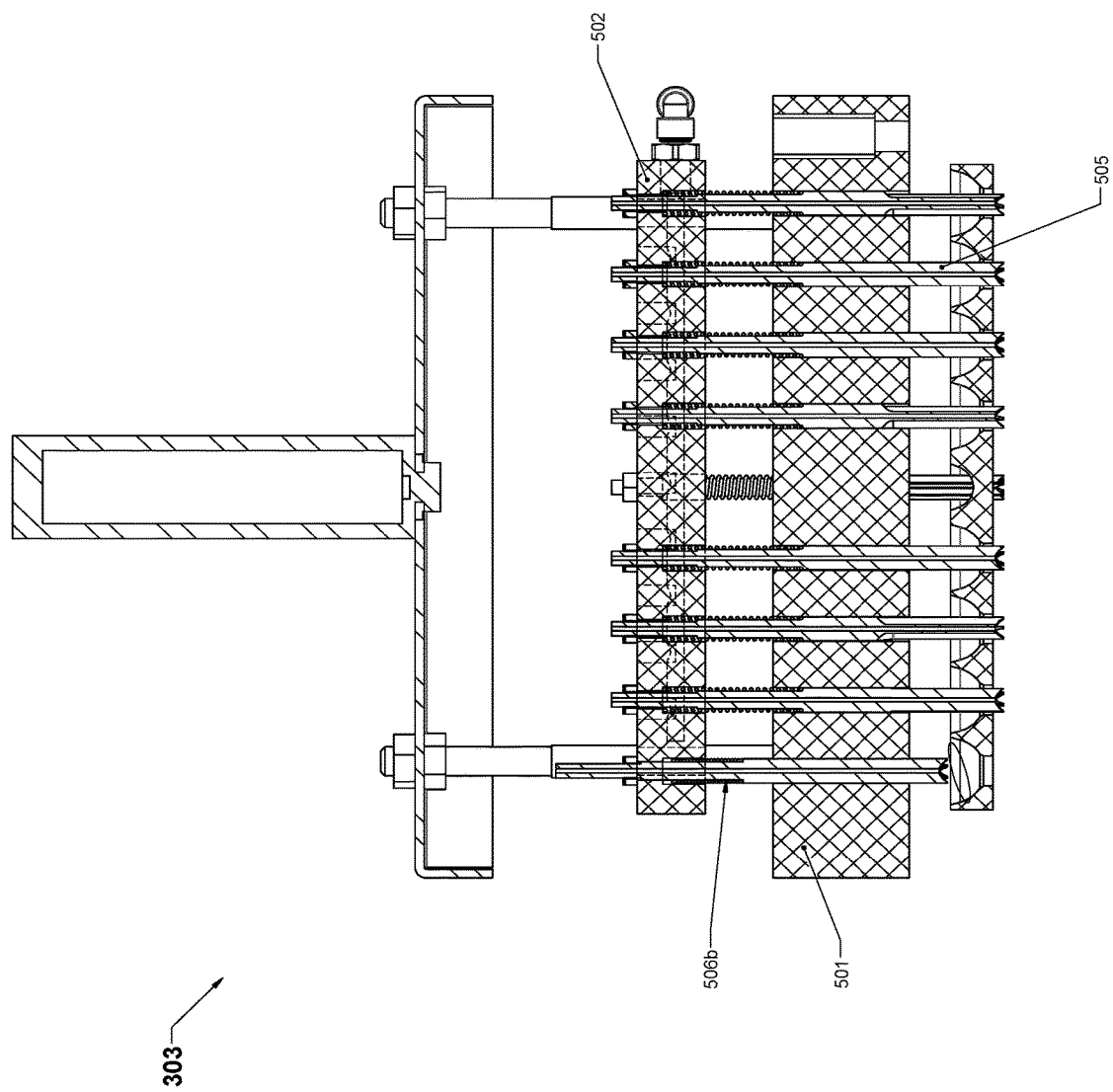
FIG. 5B is a cross section view of the punch of FIG. 5A.

FIG. 5A shows an exploded view of the punch. FIG. 5B is a perspective view of the punch of an apparatus for pitting drupes, showing when the punch enters the matrix of the conveyor. The punch has a punch base 501. The punch base can be fixed on the frame by means of bolted connection with the hinge 519 and the punch lock 120. The punch base 501 has multiple uses. It is the foundation support of the complete punch assembly. Four punch guides 503 are threaded the whole way through and connect the rest of the punch assembly. A number of holes on the punch base 501 are guides for the knives 505 and piston guides 504.

In one embodiment, there is a hole on the punch base to install the proximity sensor 509. The proximity sensors can be fastened by nuts. The punch base has rigidity but also is made of wear resistant material. The punch base is also used as a stopper so the pitted fruits that stay stuck on the knife during its ascent back to upward position falls back down into the matrix support member.

The punch base 501 acts as a stopper for the fruit to fall back down when knives 505 come back in upward position. In one embodiment, the punch base has a hole going through the pass ways of the knives guide holes. This is meant for an air supply. This feature acts as an air manifold that distributes air to the knives when at their maximum descent distance. A recess is created on the knives. The recess creates a pass way through radial holes to connect to the radial bore of the knife. This allows air to be conducted inside the bore of the knives and be used as the same manner of pit expulsion. When the screws from the punch lock are removed, the punch can be rotated 90 degrees to give access to the under part of the punch assembly and access to the knives and do maintenance or cleaning.

In one embodiment, the punch base is the foundation of the complete punch sub-assembly system. The punch base supports the guides 503. The punch base can easily be removed and it has a hinge and can pivot 90 degrees to the back. A hole passes through the length of the punch base and connects as a pass way for air to be conducted to the knives.

Referring to FIG. 5A, the punch has a punch piston 502. The punch piston 502 is used as a fluid distributor (e.g. air distributor). For example, the punch piston 502 carries the knives and the guides. For example, the punch base may use a manifold. The punch base may use fixed and flexible pipes.

Punch pistons 502 are guided in four corners by guiding holes aligned by the punch guides 503. The actuator 508 can be connected and locked with a set screw on the punch piston 502 and controls the upward and downward motion. The punch piston 502 plunges in an up and down stroke carrying the knives 505 and the guides 504.

In one embodiment, the actuator may receive energy in the form of a compressed fluid. The compressed fluid can be in the form of compressed air. For example, the actuator may receive compressed air from the air junction box. The actuator is configured to convert the received energy into mechanical motion. The motion can be linear. For example, the actuator may move up and down. As another example, the actuator may move in an upward and downward motion.

In one embodiment, the air pressure received by the actuator can be at a minimum of 80 psi. In one embodiment, the air pressure received by the actuator can be lower than 80 psi. In one embodiment, the air pressure received by the actuator can be about 100 to about 300 psi.

In one embodiment, the air pressure received by the actuator can be at a minimum of 3.8 kPa. In one embodiment, the air pressure received by the actuator can be lower than 3.8 kPa. In one embodiment, the air pressure received by the actuator can be about 3.8 to about 14.3 kPa.

In one embodiment, the actuator converts the received energy into a mechanical motion to drive the movement of the punch piston. By activating the actuator, the punch piston may plunge in an up and down stroke, carrying the knives and the guides.

The holes where the knives 505 are fixed have a loose slide fit and have a counter bore to allow a spring 506 to enter. The spring 506 pushes down the knife 505 on a step surface and permits it to have a stroke. The knives 505 are blocked on the top side of the piston 502 by locknuts 511 so that they don't fall and are adjustable in height and spring pressure. The punch piston 502 also acts as a manifold fluid (air) distributor. Tube fitting 512 and 515 are fastened by threads into the manifold pass ways.

In one embodiment, the punch base may use the piston as an air distributing manifold. A hole may pass through the length of the piston and connects in a manifold type manner as a pass way for air to be conducted to the knives through tube fittings 512 and air tubes 513.

Referring to FIG. 5A, the punch has punch guides 503. The punch guides 503 connect the punch base 501 with a connection to the punch plate 507 that is locked by nuts 514 fastened from bottom and top. They also are the guides for the punch piston designed to have a loose slide fit connection to have the least friction possible during the up and down movement of the piston.

Referring to FIG. 5A, the punch has piston guides 504. The piston guides 504 are part of the punch piston sub assembly 502. They are used to guide the piston 502 through its descent and ascent, guided by the holes in the punch base 501 in a slide fit manner. In one embodiment, the piston guides are inserted in holes of the piston 502 by means of locknuts 511 on the top side. Springs 506 surround a part of the guide 504 section in a slide fit relation. They can be held between a counter bore under the piston 502 and a shoulder part of the guide 504.

The piston guides 504 are adjustable in height and spring pressure by the locknut 511. They are guided by the holes in the punch base 501 in a slide fit manner. During descent, they can either come into interference with the matrixes if not properly aligned but they are supposed to align the complete assembly of knives 505 with the holes of the matrixes where drupes are to be pitted.

The tip of the piston guides 504 may have a spherical shape to enter smoothly into the guided holes of the matrixes that also have a chamber to make it smoother for entry if a slight misalignment occurs.

The piston guides 504 have the advantage to act as a safety protection for the knives 505. They are spring loaded and protect the knives 505 from having collisions with the matrix. The piston guides can be longer than the knives. The piston guides may have a longer stroke than the knives. The piston guides follows the piston 502 in its descent for alignment of the matrixes. In operation, the piston guides can be activated before the knives. If there is a misalignment, the piston guides will hit the conveyor chain before the knives. If the piston guides does not align in the alignment holes in the conveyor chain, the machine stops working. The sequence of the machine is stopped and there is an emergency stop. The machine has to be restarted.

The piston guides 504 are blocked on the top side of the piston 502 by locknuts 511 so that they don't fall. The piston guides 504 are adjustable in height and spring pressure.

In one embodiment, the piston guides have a rigid assembly. In a further embodiment, the piston guides do not have a rigid assembly and a spring 506 is installed on the piston guides. Then, they have a stroke to protect the components of the punch if an unusual impact occurs. The guides are designed to be longer and protect the knives 505 for any impact. Their stroke ends before the knife attains the surface of the matrix so no impact is possible at any time.

Referring to FIG. 5A, the punch has springs 506. The springs 506 surround a part of the piston guide and knife section in a slide fit relation. The springs 506 are held between a counter bore under the piston 502 and a shoulder part of the knife or piston guide. The springs 506 protect the punch system but also the matrixes. If an unusual interference or impact happens either with the punch guides 50 when they hit the conveyor chain, the springs 506 will absorb the impact. The springs 506 will also absorb any impact on the knives 505. For example, they can be arrange to always touch the matrix surface with a slight spring load so when the recess of the matrix guide hole approaches, the guide pin will insert its way into the hole way because of the pressurized spring. This will pre align the piston before its descent.

Referring to FIG. A5, the punch has an actuator 508. The cylinder may be fixed on the punch plate 507 by means of a threaded nut. The movable piston has an external rod that connects to the punch piston 502 to conduct the up and down stroke.

The punch has a proximity switch 509. The proximity switch can be connected to the punch base 501 by means of threaded nuts. They detect the metal of the conveyor rod 503 to send a pulse signal to the programmable logic controller (PLC) to stop the conveyor chain at the right place for the punch to activate the descent of the knives 505.

The punch has a proxy plug 510. The proxy plug can be connected by means of threads and electrical connection going towards the main junction box.

The punch has locknuts 511. The locknuts are on top of the piston 502 and are fastened on the end of the knives 505. They are meant to adjust height and spring pressure of the springs 506 and to lock the knives 505 in place.

The punch has tube fittings 512. The tube fittings 512 can be connected by thread above the locknut 511 to the end of the knife threads. They are than connected to a tube 513 that connects to the manifold of the punch piston 502 by another tube fitting fastened by threads.

The punch has air tubes 513. The air tubes 513 conduct air from the manifold of the piston 502 to the knives 505 through quick connect in tube fittings 512.

The punch has nuts 514. The nuts 514 can be used to fix the punch plate 507 at a determined height and enables adjustments if necessary. The nuts 514 enable to adjust the height of the piston 502.

The punch has a tube fitting 515. The tube fitting 515 can be connected to the punch piston 502. The tube fitting 515 may also be connected to a tube that goes to the air junction box and connects to the exhaust pass way of a solenoid valve.

The punch has knives 505. The knives 505 are part of the punch piston sub assembly 502. The knives can be inserted in holes of the piston 502 by means of locknuts 511 on the top side. Springs 506 surround a part of the knife 505 section in a slide fit relation and are held between a counter bore under the piston 502 and a shoulder part of the knife 505. The knife 505 can be adjustable in height and spring pressure by the locknut 511. The knives 505 are guided by the holes in the punch base 501. The knives 505 follow the motion of the punch piston 502 and are normally not moving unless an interference is made with the matrix because of an unusual misalignment or a foreign body (very large pit) blocking the way. In that case they have a stroke to absorbed the impact and protect the system and especially the tip of the knife.

Tube fittings 512 are connected to the knives. For example, the tube fittings 512 are connected by thread above the locknut 511 to the end of the knife threads. The tube 513 can be connected to the manifold of the punch piston 502 to conduct air to knives 505.

Drupes (e.g. fruits) are being pierced by the knives 505. The pits of the drupes are being pushed through a narrower orifice (or narrower opening) in the matrix and down into a pass way of the ejection section.

FIG. 6A shows a cross section of the punch piston sub assembly of FIG. 5A. As shown on FIG. 6A, a knife 505 have an internal bore 520 in the longitudinal direction.

In one embodiment, the internal bore longitudinally extends from the top of the knife to the tip of the knife. In another embodiment, the knife comprises a fluid inlet on a side surface of the knife, wherein the fluid inlet connects to the internal bore.

The internal bore 520 permits a fluid (e.g. air, water, etc.) to pass through. Embodiments of the knife and/or the internal bore 520 are shown on FIGS. 7A1, 7A2, 7A3, 7A4 and 7A5.

The internal bore 520 helps to eject the pit (core) of a drupe by means of a fluid jet. In one embodiment, the fluid jet can be an air jet. The air is distributed in each knife 505 and an air jet is programmed to give an air burst at the end of a downward stroke to push or blow away the core and the residues of a drupe. The core and the residues are sometimes retained by filaments of flesh of the drupes. Or, the core and the residues may remain stuck in the knife. The air jet comes out at the tip of the knife 505. For example, the air jet 803 is shown on FIG. 6A. Further, FIG. 8 shows the air jet 803 once the knives 505 have gone through the support members of the conveyor chain.

Referring to FIGS. 5A, 5B, 6A and 6B, element 502 can be an actuator to which a plurality of knives are connected. For example, the actuator can include a manifold 502a that is defined within an internal portion of the actuator. The manifold can be configured to distribute a fluid to the internal bore of the knives, such that the knives are connected to the actuator and the manifold distributes air to the plurality of knives. For example, a surface of the actuator defines an inlet for receiving a fluid such that the inlet is connected to the manifold, and the manifold is connected to at least one outlet defined on the surface of the actuator, such that the outlets are connected to the plurality of knives. For example, the outlets can include tubes for conducting the fluid from the manifold to the knives.

For example, a 90 pound per square inch (psi) air pressure can be used for the air jet. This may make a considerable positive difference in the percentage of cores left at the end of the pit removal process.

In one embodiment, the pressure of the air jet can be of at least 90 psi. For example, the pressure can be at about 90 to about 120 psi.

Ejection of the drupe can be at a pressure of at least 90 psi. For example, the pressure can be at about 90 to about 120 psi.

In one embodiment, the pressure of the air jet can be of at least 4.3 kPa. For example, the pressure can be at about 4.3 kPa to about 5.7 kPa.

Ejection of the drupe can be at a pressure of at least 4.3 kPa. For example, the pressure can be at about 4.3 kPa to about 5.7 kPa.

The knives 505 may have a safety feature. As they are attached to the spring in the assembly, they are not fixed. They are spring loaded with a determined stroke that is adjustable with a nut that is on top of the piston 502. If a residue or a larger than usual pit (core) gets in the way of the descent of the knives and is blocked by the matrix, the knife 505 will absorb the impact with the spring 506 to protect the whole system and especially the tip of the knives 505. FIG. 5.B shows spring 506b in compressed state due to object stuck.

The noise of the knife sliding back to its neutral position can be abnormal and loud enough for the operator to notice easily, especially if it's being reproduced continually. When a knife or guide misalignment happens, the machine may automatically stop. A limit switch or laser detection on the punch piston top surface can be added to recognize the malfunction of the springs connected to the knives.

The knives may have four or more blades and have a hollow in concave shape of variable depth to ensure that the core or pits do not remain stuck. FIGS. 7A1, 7A2, 7A3, 7A4 and 7A5 show exemplary embodiments of blades 525 of a knife 505. In one embodiment, the knife uses six blades 525. These blades may grip pits of any size. The diameter and hole in the center of the knife can be as small as possible to limit damages to the drupe that is being pierced by the knife.

In one embodiment, the knives are configures to cut small drupes, such as olives and cherries. For example, the diameter of the internal bore of the knife can be about 15 to about 25%, about 15 to about 20%, or about 17% of the outer diameter of the knife. The person skilled in the art would understand that if the diameter of the internal bore is too big, it does not make a nice cut and it might generate a large hole in the drupe and greatly damage the drupe.

The knife blades may have multiple edges to form a variety of shapes in the drupe. For example, the blades may have more than four edges to form a spherical to thin oval shape in the drupe. In one embodiment, the blades can have 6 edges.

In one embodiment, the knives may have four or more blades and have a hollow and/or concave shape of variable depth to ensure that the core or pits do not remain stuck on the blades. The depth of the inner shape of the knife should not exceed half the diameter of the point (or cutting surface) of the knife or the risk having a pit stuck in the blades increases.

In one embodiment, the support member and the knives can be fabricated with a 5 axis machine, such that the shape of the knife matches the shape of the support member. For example, the shape of the support member can be configured to match a particular shape of knife for precision.

In one embodiment, the knife bore can be fabricated with a technique of EDM drilling or a technique of extrusion. In one embodiment, the bore can have a diameter of about 0.0625 to about 0.085 inches. In one embodiment, the bore may have a diameter greater than 0.0625 inches.

The hole 535 allows fluid (e.g. air) to get sufficient force to push the core of a drupe. The thickness of the blades 525 should be as thin as possible to reduce the damage to the fruit but also thick enough to have rigidity and durability. The diameters of the knives can be determined by the size of the drupes.

Figure 6B:
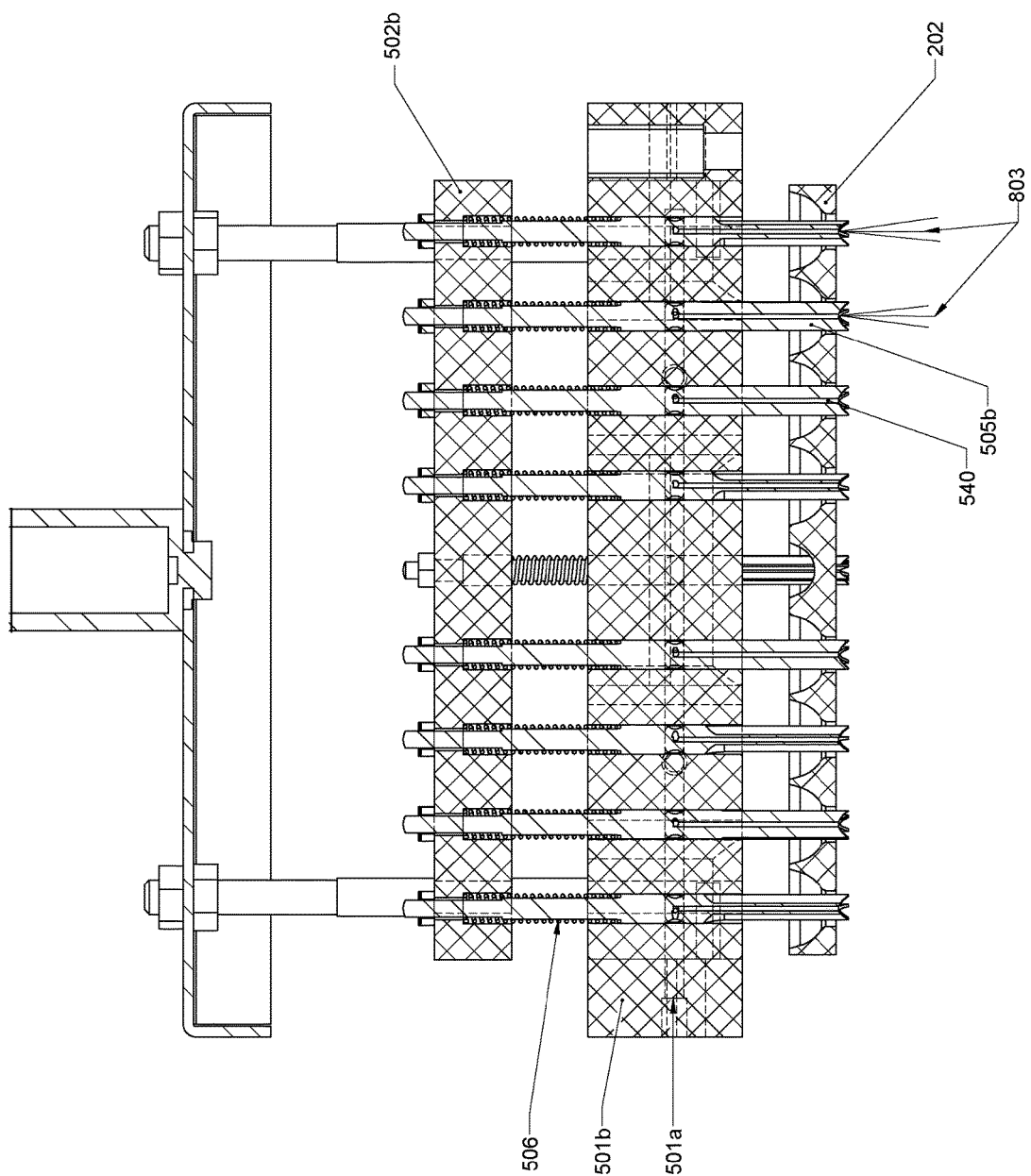
FIG. 6B is a cross section view of a punch connected to knives having a radial bore that connects with an longitudinal bore according one embodiment.

FIG. 6B shows another embodiment of the cross section of the punch piston sub assembly. As shown in FIG. 6B, the internal bore 540 does not go through the entire length of the knife 505b. Instead of having a longitudinal bore through its entire length, the knife 505b has a central bore 540. The central bore 450 has a longitudinal bore that connects to the tip of the knife 505b. The central bore 450 has a radial bore that connects with the longitudinal bore for air passage.

FIGS. 7B1, 7B2, 7B3, 7B4 and 7B5 show exemplary embodiments of blades of a knife. As shown on FIG. 7B5, a recess 545 is created on the knife 505b. The recess can be located at a central portion of the knife. The recess 545 creates a pass way through radial holes to connect to the radial bore of the knife 505b. The recess 545 allows air to be conducted inside the bore of the knife 505b and be used as the same manner of pit expulsion as explained in the case of knife 505.

The air jet passes the radial bore 545 of the knife 505b. Then, the air jet goes through the longitudinal bore and comes out the tip of the knife 505b.

The air is supplied in the pass way 501 a through the punch base 501 b. When the punch piston 502 b arrives at its end stroke, the recess 545 in the knives 505 b align with the air pass way 501 a and air is pushed and distributed to force an air jet (or air push) through the central bore of a drupe through to the tip knife to eject any residues which are sometimes retained by filaments of flesh of the drupe. The air jet may also push any remain stuck in the tip of the knife.

Referring to FIGS. 9A and 9B, there is shown an exploded view of the air junction box. The air junction box can be bolted on the frame right by means of screw and locknut in four corners. The air junction box has a base 901 and a top 902.

The air junction box has one or more valves 903. The valves can be solenoid. The valves can be fixed on the back plate 904. They can be activated by the PLC and distribute air through air hoses to the actuator 508, the fluid injector 421 and the punch piston manifold 502. They can be activated in a predetermined sequence. The air inlet may come from a compressor that has air conducted through components that are approved for food industry.

The air junction box has a back plate 904. The back plate is bolted on the air junction base 901. The back plate may fix the valves and regulators inside the box.

The air junction box has cord grips 905. In one embodiment, the cord grips 905 are fastened on the base 901 and are meant to be a sealed pass way to the outside of the air box. One is used for the air inlet from the compressor. Three are used for air tubes that goes to the actuator 508, the fluid injector 421 and the punch piston manifold 502. One is used for the proximity switch cable 510. One is used for limit switches for the actuator 508. One is used for two twelve volts (12 V) wires that go to the motor.

The air junction box has a cord grip 906. In one embodiment, the cord grip 906 is fastened on the base 901 and is meant to be a sealed pass way to the outside of the air box. The cord grip 906 is meant to be a sealed entry to connect the conduit 907.

The conduit 907 is connected to the cord grip 906. The conduit 907 is also connected to the quick connect casing 908 and plug 909. The quick connect casing 908 can withstand wash-downs and is good protection against water projected from a nozzle. It is used to protect the connections while maintaining access.

The conduit 907 is the pass way towards the electrical junction box 310 and wires that goes to the valves and to its respective actuator or sensors. A quick connect casing 908 connects to the conduit 907. It has a lock connection to the junction box 310. It may have a fast lock connection to the female part (1016 and 1017) of the junction box 310.

The quick connect is used as a 'plug with multi contacts. For example, there might be 16 multi contacts. Wires that go through the conduit 907 are terminated in a specific numbering. The male quick connect matches the female quick connect from the electrical junction box 310. The male part has no energy (electricity), the energized part comes from the female. The male quick connect matches the female (10.16, 10.17) of the electrical junction box 310.

Referring to FIG. 10, there is shown an exploded view of the electrical junction box. A back plate 1002 is mounted on the electrical junction box. A rail mount 1004 is mounted on the back plate 1002. A power supply 1003 is mounted on the rail 1004. The power supply can be twelve volts (12 V). A power supply 1005 is mounted on rail 1004. The power supply 1005 can be twenty four volts (24 V). A stopper 1006 is mounted on rail 1004. A ground terminal 1007 is mounted on the rail 1004.

A DC fuse 1008 is mounted on the rail 1004. An AC fuse 1009 is mounted on the rail 1004. A terminal (2.5 mm$^2$) 1010 is mounted on the rail 1004. A controller device 1011 is mounted on the rail 1004. The controller device can be a programmable logic controller (PLC). The controller device can be a ZELIO SR2E121BD. The controller device manages the operation of the machine (or apparatus). The controller device sends control signals to manage the operation of the system and every actuator, motor, sequence, timing, speed of the machine can be adjusted at any time. The controller device has a program for controller the operation of the machine. The program can be uploaded to the controller device wirelessly or through a port (such as a USB port) by a computer.

For example, the controller device may detect the operation of the conveyor chain. The controller device may stop the conveyor chain at the right place for the punch to activate the descent of the knives 505.

The controller device may activate the air distribution system and distribute air through air hoses to the actuator 508, the fluid injector 421 and the punch piston manifold 502.

A relay 1012 of 12 volts is mounted on the rail 1004. A relay (RAUR1) 1013 is mounted on the rail 1004. A relay 1014 of 12 volts is mounted on the rail 1004. A cover 1015 is mounted on electrical junction box. There is also shown the quick connect casing female 1016 and the quick connect female poles 1017. The quick connect casing female may have 16 poles. The quick connect casing female is plugged from the electrical junction box to quick connect casing 908 and plug 909.

Referring to FIG. 11, there is shown an embodiment of the chain tension block described previously in FIG. 4A. FIG. 11 will be described by referring to some of the elements described in FIG. 4A. The back bushings 1111 are inserted in openings of the frames 401 and 402 where they have place to slide. It is slid on the driven shaft 413 and is used as a bushing. It is blocked one axis by a retaining ring and the other axis is aligned by a rod 1112 that is guided by chain tension block 411. This tensioning rod 1112 is fastened by threads to the back bushing 1111. A nut is fastened on the thread before inserting the spring. Then it is inserted in the hole of the chain tension block 411 in a slide fit relation.

The spring 1113 is inserted on the tensioning rod 1112 and is squeezed between the nut 1114 and the tension block 411. The nut 1114 is threaded on the tensioning rod 1112 and pushes on the spring 1113. It is used to adjust tension of the conveyor chain.

Another alternative of embodiments of an apparatus for pitting drupes is shown in FIGS. 12, 14, 15. The drum type apparatus 1300 is very similar in function to the apparatus 300. Some components are identical and they will refer to the same numbers as the apparatus 300.

As shown in FIGS. 12A, 12B, 12C and 12D, the supply section 103 is configured to receive drupes. The drum type apparatus 1300 has a conveyor belt in the form of a drum assembly 1107. The drum assembly has a plurality of openings configured to receive drupes located at supply section. For example, the drum has holes for aligning the support members under the knives. For example, the matrix can be machined or molded plastic parts.

Referring to FIG. 13A, a drive plate 1407 is connected to the matrix drum 1202. For example, the driven plate can be fasten to the matrix drum by bolt connections. For example, the drive plate is fastened to the matrix drum by inserting drum rods into hole 1408A, such that the rods are threaded and tighten in screw manner connection. For example, the drum plate driven 1407 and drum plate drive 1408 are both fixed to the drum in a symmetrical manner to have a perfect alignment.

For example, each row of the drum may have holes for aligning the support members. For example, the matrix drum has two alignment holes that guides piston guides to align perfectly before knives enter the support members designed to receive the fruits. The tip of the piston guides may have a spherical shape to enter smoothly into the guided holes of the matrixes 1202 that also have a chamber to make it smoother for entry if a slight misalignment occurs. FIG. 13B1 shows a top view of the matrix 1202, including the support members. FIG. 13B2 shows a cross section of the matrix 1202. For example, the support members can be identical as explained above.

Returning to FIG. 12A, a retaining bin 1105 keeps the drupes from falling and directs them into the matrix drum assembly 1107. The drum rotates and brings the drupes to the transformation section. The conveyor may bring the drupes to the transformation section with a raised angle to help the drupes fall by gravity while displacing. A conveyor brush 109 helps to push back fruits that have not fallen into support members of the matrixes until they fall into an empty one.

Figure 12B:
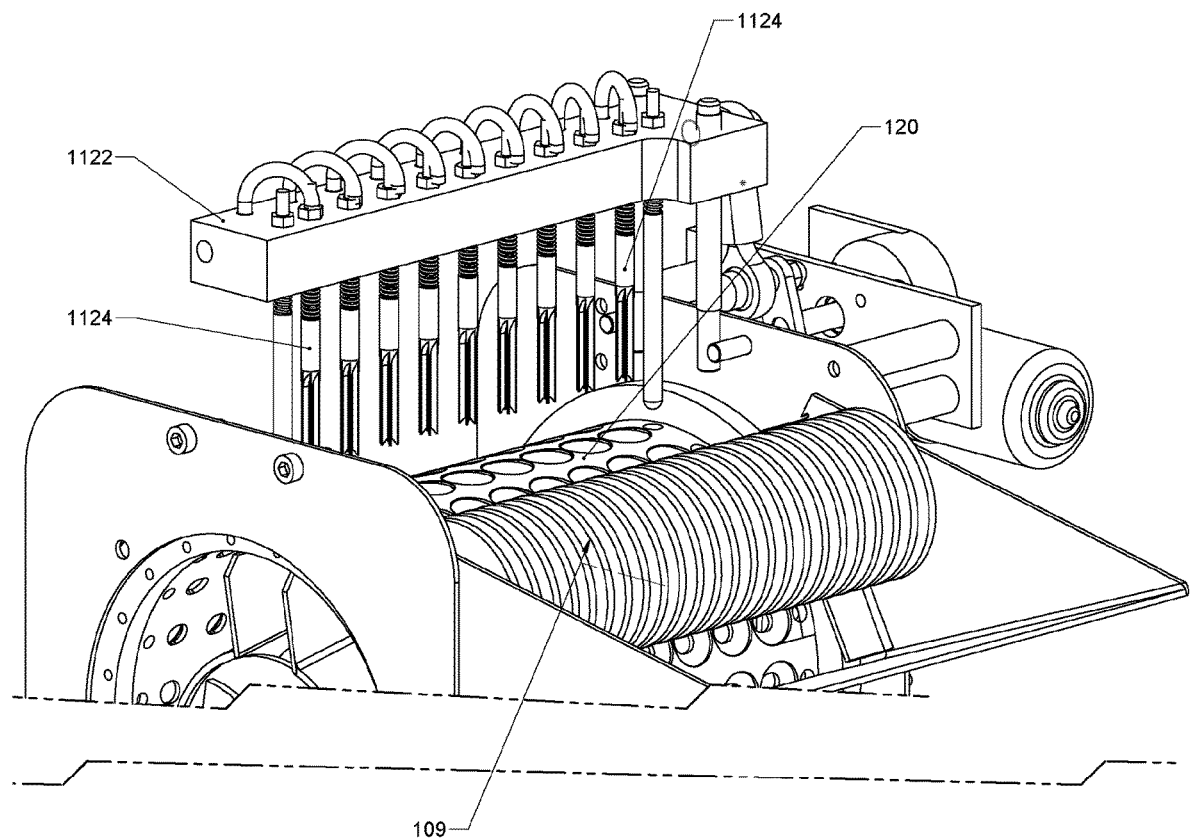
Figure 12C:
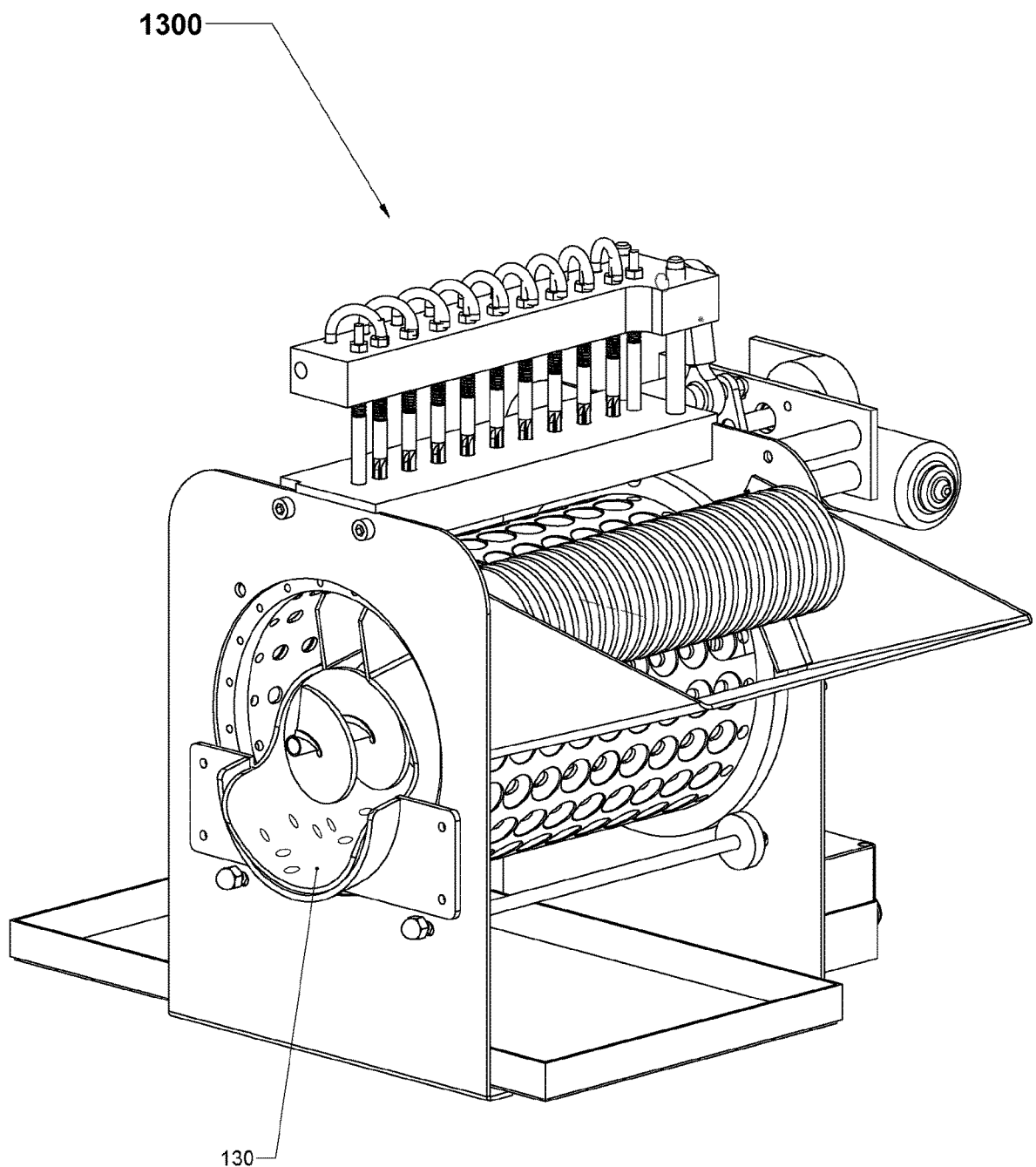
Figure 12D:
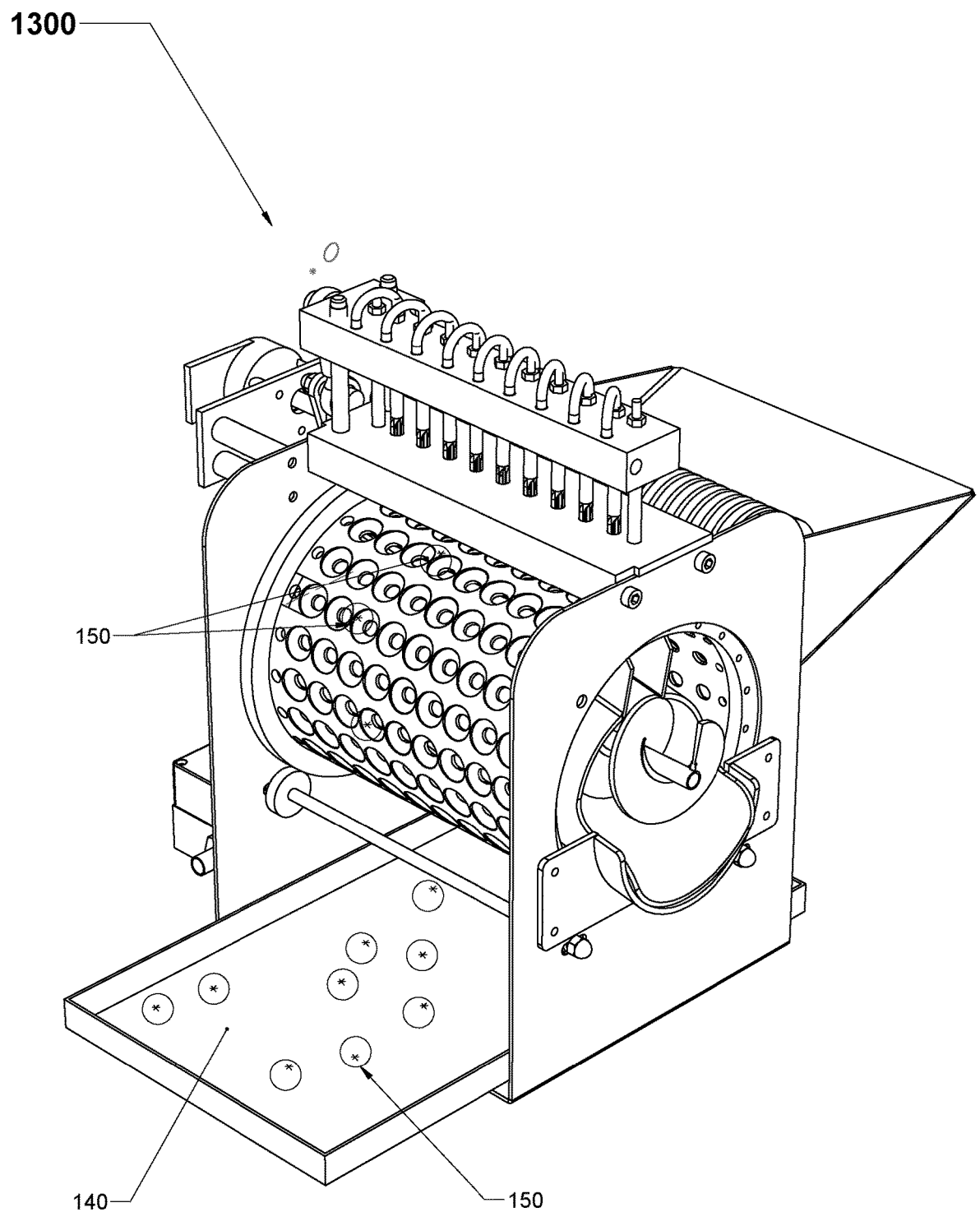

For example, as shown in FIG. 12B, the transformation section includes an actuator 1122 having punch elements. For example, each punch element can be composed of a piston with a knife 1124. For example, the knives and punch can be identical to knives and the punch and explained in further details above.

Referring to FIG. 12A, there is shown an apparatus 1300 for pitting drupes. The apparatus 1300 has a frame 1301. The frame 1301 is the main supporting structure of the apparatus 1300 to which all other elements are attached. All elements of the apparatus are attached to the frame 1301 by screw connections or retaining rings.

An actuator can be mounted on the frame of the apparatus. For example, the actuator can be a pneumatically powered actuator, a mechanical actuator, a thermal actuator, an electric actuator or an hydraulic actuator Referring to FIG. 15, there is shown a cross section view of punch 502 to which a plurality of knives are connected. The punch is connected to an actuator. FIG. 15 illustrates some of the same elements shown in FIGS. 5A and 6A, which were previously described above.

Referring back to FIG. 12A, an actuator 305 can be mounted on the support 1409 to the frame 1301. For example, the actuator 305 can be an electrical motor. The motor can be an AC or DC motor. For example, the motor can be an AC induction motor, an electromagnetic AC motor, etc. The motor can be directly or indirectly connected to the drum to rotate it. In FIG. 12A, the motor 305 rotates the matrix drum assembly 1107.

Referring back to FIGS. 13A, 13B and 14, the matrix drum assembly 1107 can be supported by bearings that are under the drum plate driven 1407 and drum plate drive 1408. Referring now to FIGS. 14 and 15, the drum plate drive can be configured to rest on rotating members 1418, such that the rotating members provide additional support to the matrix drum. For example, as the drum plates rotate, the rotating members rotate with a speed proportional to the speed of rotation of the drum plates. For example, each internal side of the support frame can have a pair of rotating members as shown in FIG. 14. A rod 1403 can be used to connect opposing rotating members such that the connected opposing members rotates at the same speed.

The matrix drum assembly has support members to receive drupes. The matrix drum assembly 1107 carry the fruits to all four stations, namely the supply section, the transformation section, the ejection section and the processed section. The matrix drum assembly 1107 consists of three components: matrix drum, drum plates and drum rods. The matrix drum is interconnected together with the drum plates by means bolts and drum rods.

The matrix drum assembly 1107 has holes for alignment of pistons located in the punch 1303. Therefore, knives located in the punch 1303 may align under the support members in their descent by the means of piston guides. The punch 1303 is attached to the frame 1301 by screw connection, for example, through hinges and/or punch locks, as shown on FIG. 14.

FIG. 16 shows a side view of an apparatus for pitting drupes. There is shown an endless screw mechanism 1320 that rotates to push out the pits (or pitted flesh) out of the ejection section 130. The pit slide 1330 is isolated from the drum interior so no pits can return through a hole. Wipers 1311 are connected to the pit slide 1300. The endless screw mechanism 1320 is fastened to the drive plate 1408 in the center, for example, by bolt connection. For example, the endless screw mechanism rotates with the matrix drum 1107. For example, the endless screw mechanism can be adapted to push out the flesh and pits from pitted food. The pit slide support 1340 is mounted (for example, by bolt connection) to the frame and supports the pit slide 1330. For example, a wiper 1311 is attached to the pit slide 1330 by screw connection. For example, the wipers can be configured to touch the bottom part of the support members of the drum matrix a few centimeters after the knives go through the support member opening. For example, the wipers advantageously wipe by friction any pits or residues that may get stuck or have not fallen by gravity on the conveyor chain.

Referring to FIG. 14, there is shown an exploded view of the frame. This figure also shows the parts for mounting the actuator on the support frame. The actuator is mounted on a plate 1409 by way of fasteners. The plate 1409 is mounted on the support frame by way of fasteners 1509 and 1513. Intermediate members 1511 and 1512 can be used to facilitate fastening the plate at the internal and external surface of the support frame.

As shown in FIG. 14, there is shown an exploded view of the frame. The frame has a right frame 1401 and a left frame 1402. For example, the frame can be made of metal or plastic with predetermined shapes and holes. Parts can be installed on it. In one embodiment, the frame is made of a transparent plastic. The frame has rods 1403. The rods 1403 have two important functions. They are used to fix the right frame 1401 and the left frame 1402 together. The rods 1403 serve also as fixation for the bearings that than supports the matrix drum through the connection of the drum plates 1407 and 1408. These bearing allow the rotation of the matrix drum to be have very low friction.

Referring back to FIG. 12A, there is shown that the frame has a support plate 1409. For example, the support plate 1409 can be centered at a pre-determined position and fixed by screw connection and spacers on the right frame 1401. For example, the actuator can be mounted on the support plate by screw connection.

The actuator can also be connected to the cam assembly. For example, the actuator can be connected to the cam assembly by way of a rod assembly. For example, the actuator can be connected to the cam assembly such that the actuator causes the cam assembly to move up and down at predetermined intervals.

For example, the actuator can convert a received energy into a mechanical motion to drive the movement of the cam assembly. FIGS. 17A and 17B shows the cam assembly consists of a cam 1511, a connecting rod 1512, and shoulder screws 1513 used as fixations for the connecting rod ends. For example, the cam assembly can have two functions. First, as can be shown in FIG. 17A, each revolution of the cam assembly creates a linear movement by pushing the drum rod 1203. That than creates a rotation of the drum in one determined pitch angle (X degree) to advance to the next row of support members. Secondly, the cam assembly can drive the movement of the punch piston 1502. By activating the actuator, the punch piston may plunge in an up and down stroke, through the attachment of the connecting rod 1512 and shoulder screws 1513 that are fastened to the punch piston and the cam 1511. As shown in FIG. 12A, there is a tension adjustment guide assembly 1410 on the frame. FIG. 18A shows a front view of a tension adjustment guide assembly 1410. FIGS. 18B and 18C show that the tension adjustment guide assembly can have four parts: a sleeve connection 1411, a ball 1412, a spring 1413 and a tension adjustment bolt 1414, see FIG. 111. For example, the tension adjustment guide assembly can be fixed on the frame by screw connection at a determined position. Its function is to have constant pressure of the ball 1412 rolling on the drum plate drive 1408. It falls into a recess hole 1408A of the plate 1408, which are shown in FIG. 13A. It always touched the drum plate surface with a spring load so when the predetermined holes of the plate 1408 approaches, the ball 1412 will insert its way into the hole. This will pre align the matrix drum before the punch 1502 makes its descent. If any minor misalignment occurs prior to descent this technique will help eliminate it.

According to one embodiment, an actuator can be used to activate the the rotation of the matrix. For example, the actuator can be a pneumatically powered actuator, a mechanical actuator, a thermal actuator, an electric actuator or a hydraulic actuator. As shown in FIGS. 19A, 19B and 19C, an air drive assembly having a pneumatic actuator can be used to activate the rotation of the matrix. The pneumatic actuator 1305 is air operated. Limit sensors are used to detect the stroke ends. This creates a linear movement pushed by the shaft of the actuator 1305 that pushes on the drum rods 1203 in one determined pitch angle (X degree). The stroke Y pushes to the next row of support members. A rod clevis with pin 1307 is bolt connected to the end of that shaft. A swivel push bracket 1306 is mounted on the pin of that rod clevis 1307. That connection enables the swivel push bracket 1306 to rotate (for example, at 90 degrees rotation) in one direction and be pulled back by an extension spring.

There are advantages using a Matrix drum 1107 assembly. It is lighter, has fewer assembled components, it is faster to make a full cycle because shorter travel distance, less friction etc. We look at a performance of 10-15% faster and more efficient.

Accordingly, a method for removing a pit from a drupe can be used on the apparatus as described above. The method includes the steps of: placing the drupe into a support member of the conveyor as described above, the support member having a top opening and a bottom opening; guiding a knife into the top of the drupe to push the pit out of the bottom opening; and pushing a fluid into an internal bore of the knife to a tip of the knife to push the pit and residues out of the drupe. The method further includes the step of aligning the support members under the knife with the piston guides. The method further includes the step of blowing air into the support members to push the drupe or the residues out of the support members.

According to one embodiment, a method for pitting drupes includes placing a drupe on a support member having an opening at the bottom of the support member; inserting a knife into the drupe and injecting a fluid through a tip of the knife to eject a pit and/or residues out of the drupe and through the opening. For example, the method can also include aligning the support member and the knife by inserting a guide into a recess or hole defined in the support member; and inserting the knife into the drupe and injecting a fluid through the tip of the knife to eject the pit and/or residues out of the drupe and through the opening.

For example, the method can also include placing the drupe on the support member; aligning the support member and the knife by inserting a guide into a recess or hole defined in the support member; inserting the knife into the drupe and injecting a fluid through the tip of the knife to eject the pit or residues out of the drupe and through the opening; removing the knife from the drupe; and removing the guide from the recess or hole. For example, a period of time during which the guide is inserted into the recess or hole lasts longer than a period of time during which the knife is inserted into the at least one drupe.

For example, the method can also include: passing the drupe through a first opening of the support member and placing the drupe on a second opening of the supporting member that is smaller in size than the drupe; aligning the support member and the knife by inserting a guide into a recess or hole defined in the support member; passing the knife through the first opening of the support member, inserting the knife into the drupe, injecting a fluid through the tip of the knife to eject a pit and/or residues out of the drupe and through the second opening of the support member; removing the knife from the drupe; and removing the guide from the recess or hole.

For example, the method can also include: injecting a fluid through the second opening of the support member to eject the drupe therefrom. For instance, the fluid is injected into the second opening at a pressure of at least 4.3 kPa. For example, the fluid can be injected into the second opening at a pressure of about 4.3 kPa to about 5.7 kPa. For example, the fluid can be injected into the tip of the knife at a pressure of at least 4.3 kPa. For example, the fluid can be injected into the tip of the knife at a pressure of about 4.3 kPa to about 5.7 kPa. For example, the knife can be inserted into the drupe at a pressure of at least 3.8 kPa. For example, the knife can be inserted into the drupe at a pressure of about 3.8 kPa to about 14.3 kPa.

For example, the method can also include injecting a fluid into a pneumatic actuator, the pneumatic actuator being connected to the knife, to move the knife between a rest position and a cutting position, such that in the cutting position the knife is inserted into the drupe.

For example, the method can also include injecting a fluid into a second pneumatic actuator, the second pneumatic actuator being connected to the support member, to displace the support member.

According to one embodiment, there is disclosed a method for pitting drupes, the method including: placing one or more drupes on a conveyor including support members, wherein each of the drupes is placed on each of the support members and wherein the support member comprises an opening; activating an actuator connected to knives to position knives into the drupes, each of the knives defining an internal bore for permitting a fluid to pass through the tip of the knife; and injecting fluid through the tip of each knife to eject a pit and/or residues out of each drupe and through the opening of the support member.

For example, the actuator can be a pneumatically powered actuator, a mechanical actuator, a thermal actuator, an electric actuator, or an hydraulic actuator.

For example, the actuator can include a manifold, such that the manifold is defined within an internal portion of the actuator, the manifold having an inlet for receiving the fluid and one or more outlets connected to the internal bore of each of the knives, and wherein the manifold is configured to distribute the fluid to the internal bore of the each of the knives.

For example, the method can also include injecting the fluid into the manifold such that said fluid is distributed to the knives and injected through the tip of each of the knives. For example, the method can also include activating a second actuator to move the support member. For example, the second actuator can be a pneumatically powered actuator, a mechanical actuator, a thermal actuator, an electric actuator, or a hydraulic actuator. For example, the fluid can be air.

For example, the method further includes: injecting a fluid into a pneumatic actuator, the pneumatic actuator being connected to the knife, to move the knife between a rest position and a cutting position, such that in the cutting position the knife is inserted into the at least one drupe; and activating a motor actuator to displace the support member, the motor actuator being connected to the support member such that when activating it causes the support member to move.

For example, the method further includes: activating a motor actuator to the knife, the motor actuator being connected to the knife, to move the knife between a rest position and a cutting position, such that in the cutting position the knife is inserted into the at least one drupe; and activating the motor actuator to displace the support member, the motor actuator being connected to the support member such that when activating it causes the support member to move. For example, a pneumatic actuator can make a lot of noise when activated. To avoid or reduce these effects, pneumatic mufflers or silencers can be installed in exhaust ports of the pneumatic actuators. The noise generated by pneumatic valve exhaust ports comes from turbulent air leaving the exhaust port. The turbulence is caused by a sudden surge in the flow through the orifice of the pneumatic actuators. However, to overcome these problems, it can be advantageous to use a less-noisy actuator, such as an electric or motor actuator to guide the knives from a rest position to a cutting position.

For example, the method further includes: injecting a fluid into a pneumatic actuator, the pneumatic actuator being connected to the knife, to move the knife between a rest position and a cutting position, such that in the cutting position the knife is inserted into the at least one drupe; and injecting a fluid into a second pneumatic actuator to displace the support member, the second actuator being connected to the support member such that when the fluid is injected into the second actuator, it causes the support member to move.

A process for manufacturing the apparatus for pitting drupes as described above includes using known and common technique for manufacturing similar devices. The process for manufacturing the apparatus for pitting drupes as described above also includes using means and/or techniques described in the present application. A process for manufacturing the apparatus for pitting drupes as described above includes cutting, welding, screwing, gluing, snap fitting, nesting and/or riveting constituting elements of the device.

It was found that the devices and processes of the present disclosure offer several improved characteristics. For example, they allow for superior pitting success, large range adjustable features, greater protection of the equipment parts, better access and efficiency for managing the supply section, the ejection section and processed section, improved access for cleaning and maintenance and higher safety protection for operators. It is also fabricated with maximized dimensions and materials in order to be light weight and therefore be easy to move by hands and to be convenient space wise during transformation or storage.

Embodiments of the paragraphs of the present disclosure are presented in such a manner in the present disclosure so as to demonstrate that every combination of embodiments, when applicable can be made. These embodiments have thus been presented in the description in a manner equivalent to making dependent claims for all the embodiments that depend upon any of the preceding claims (covering the previously presented embodiments), thereby demonstrating that they can be combined together in all possible manners. For example, all the possible combinations, when applicable, between the embodiments of any paragraphs and the devices and method of the SUMMARY OF THE DISCLOSURE are hereby covered by the present disclosure.

It will of course be appreciated by those skilled in the art that many variations of the described embodiments would be possible within the scope of the invention defined by the claims herein.

The invention claimed is:

1. A device for pitting drupes, the device comprising:
at least one support member to receive a drupe, the at least one support member having at least one opening; and
at least one knife for pitting the drupe, the at least one knife defining an internal bore for permitting a fluid to pass through a tip of the knife and favoring ejection of a pitted element from the drupe; the at least one knife and the at least one support member being movable with respect to one another,
wherein the at least one knife is connected to a knife actuator, the at least one knife comprising a spring for absorbing shocks and preventing damage of the at least one knife, the spring surrounding a part of the at least one knife in a slide fit relation, the knife actuator displacing the at least one knife, the knife actuator connected to a punch piston that comprises a manifold, the manifold distributing the fluid to the internal bore of the at least one knife, the at least one knife being connected to the punch piston;
wherein a plurality of knives are connected to the punch piston and the manifold distributes the fluid to the plurality of knives, the manifold being in fluid flow communication with the internal bore of the knives; and
wherein the punch piston comprises an inlet for receiving the fluid such that the inlet is in fluid flow communication with the manifold, and wherein the manifold is in fluid flow communication with a plurality of outlets that are in fluid flow communication with the plurality of knives.

2. A device for pitting drupes, the device comprising:
at least one support member to receive a drupe, the at least one support member having at least one opening; and
at least one knife for pitting the drupe, the at least one knife defining an internal bore for permitting a fluid to pass axially through a tip of the knife and favoring ejection of a pitted element from the drupe; the at least one knife and the at least one support member being movable with respect to one another;
wherein the at least one knife is connected to a knife actuator, the knife actuator displacing the at least one knife, the knife actuator connected to a punch that comprises a punch piston and a punch base, the punch base comprising a manifold distributing the fluid to the internal bore of the at least one knife;
wherein the at least one knife comprises a fluid inlet on a side surface that connects to the internal bore, the internal bore comprising a longitudinal bore extending to the tip of the knife and a radial bore connected to the longitudinal bore and the fluid inlet.

3. The device of claim 1, wherein the internal bore of the at least one knife comprises a longitudinal bore extending to the tip of the knife and a radial bore connected to the longitudinal bore and a fluid inlet on a side surface of the knife.

4. The device of claim 1, wherein the at least one support member further defines a hole or recess for receiving a guide member, the guide member being designed to be positioned in the hole or recess for aligning the at least one support member under the at least one knife.

5. The device of claim 1, wherein the knife actuator comprises at least one of: a pneumatic actuator, a mechanical actuator, a thermal actuator, an electric actuator, and a hydraulic actuator.

6. The device of claim 1, wherein the manifold is defined within an internal portion of the punch piston and is in fluid flow communication with the internal bore of the at least one knife.

7. The device of claim 1, wherein, the outlets comprise tubes for conducting the fluid from the manifold to the knives.

8. The device of claim 1, wherein the internal bore longitudinally extends from the top of the at least one knife to the tip of the at least one knife.

9. The device of claim 2, wherein the fluid inlet is located in a middle portion of the side surface of the knife.

10. The device of claim 1 comprising a supply section, the supply section comprising a conveyor for carrying the support member.

11. The device of claim 1, wherein the fluid is air.

12. The device of claim 1, wherein the knife has at least four blades radially extending from a cylindrical wall defining said internal bore of the knife.

13. The device of claim 1, wherein the knife has six blades radially extending from a cylindrical wall defining said internal bore of the knife.

14. The device of claim 11, wherein the conveyor actuator and the knife actuator is the same.

15. A method for pitting drupes, the method comprising:
placing at least one drupe on a support member comprising at least one opening; and
inserting at least one knife into the at least one drupe and injecting a fluid through an internal bore of the at least one knife and out through a tip of the at least one knife to eject a pit out of the at least one drupe and through the at least one opening, the at least one knife comprising a spring for absorbing shocks and preventing damage of the at least one knife, the spring surrounding a part of the at least one knife in a slide fit relation;
wherein the at least one knife is connected to a knife actuator, the knife actuator displacing the at least one knife, the knife actuator connected to a punch piston that comprises a manifold, the manifold distributing the fluid to the internal bore of the at least one knife, the at least one knife being connected to the punch piston;
wherein a plurality of knives are connected to the punch piston and the manifold distributes air to the plurality of knives, the manifold being in fluid flow communication with the internal bore of the knives; and
wherein the punch piston comprises an inlet for receiving the fluid such that the inlet is in fluid flow communication with the manifold, and wherein the manifold is in fluid flow communication with a plurality of outlets that are in fluid flow communication with the plurality of knives.

16. The method of claim 15 further comprising:
aligning the support member and the at least one knife by inserting a guide into a recess defined in the support member; and
inserting the at least one knife into the at least one drupe and injecting a fluid through the tip of the at least one knife to eject the pit and/or residues out of the drupe and through said at least one opening.

17. The method of claim 15 comprising:
placing the at least one drupe on the support member comprising the at least one opening;
aligning the support member and the at least one knife by inserting the guide into the recess defined in the support member;
inserting the at least one knife into the at least one drupe and injecting a fluid through the tip of the at least one knife to eject the pit or residues out of the drupe and through said at least one opening;
removing the at least one knife from the drupe; and
removing the guide from the recess or hole.

18. The method claim 15, further comprising:
passing the at least one drupe through a first opening of the support member and placing the at least one drupe on a second opening of the support member that is smaller in size than the at least one drupe;
aligning the support member and the at least one knife by inserting a guide into a recess defined in the support member;
passing the at least one knife through the first opening of the support member, inserting the at least one knife into the at least one drupe, injecting a fluid through the tip of the at least one knife to eject a pit and/or residues out of the drupe and through the second opening of the support member;
removing the at least one knife from the drupe; and
removing the guide from the recess or hole.

19. A method for pitting drupes, the method comprising:
placing at least one drupe on a conveyor comprising at least one support member, wherein the at least one drupe is placed on the at least one support member and wherein the at least one support member comprises an opening;
activating a knife actuator connected to at least one knife to position the at least one knife into the at least one drupe, the at least one knife defining an internal bore for permitting a fluid to pass through a tip of the at least one knife; and
injecting fluid axially through the tip of the at least one knife to eject a pit and/or residues out of the at least one drupe and through the opening;
wherein the knife actuator displaces the at least one knife, the knife actuator being connected to a punch that comprises a punch piston and a punch base, the punch base comprising a manifold, the manifold distributing the fluid to the internal bore of the at least one knife, the at least one knife being connected to the punch piston;
wherein a plurality of knives are connected to the punch base and the manifold distributes air to the plurality of knives, the manifold being in fluid flow communication with the internal bore of the knives; and
wherein the punch base comprises an inlet for receiving the fluid such that the inlet is in fluid flow communication with the manifold, and wherein the manifold is in fluid flow communication with a plurality of outlets that are in fluid flow communication with the plurality of knives.

* * * * *